United States Patent
Kim

(10) Patent No.: US 9,459,785 B2
(45) Date of Patent: Oct. 4, 2016

(54) ELECTRONIC DEVICE AND CONTENTS GENERATION METHOD THEREOF

(75) Inventor: Jintae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 547 days.

(21) Appl. No.: 13/543,087

(22) Filed: Jul. 6, 2012

(65) Prior Publication Data

US 2013/0069937 A1    Mar. 21, 2013

(30) Foreign Application Priority Data

Sep. 21, 2011 (KR) ........................ 10-2011-0095113

(51) Int. Cl.
| | | |
|---|---|---|
| *G06T 15/00* | (2011.01) | |
| *G06F 3/0488* | (2013.01) | |
| *H04N 13/00* | (2006.01) | |
| *H04N 13/04* | (2006.01) | |
| *G06F 1/16* | (2006.01) | |
| *G06F 3/0481* | (2013.01) | |

(52) U.S. Cl.
CPC ........... *G06F 3/0488* (2013.01); *G06F 1/1637* (2013.01); *G06F 1/1643* (2013.01); *G06F 1/1694* (2013.01); *G06F 3/04815* (2013.01); *H04N 13/0014* (2013.01); *H04N 13/0022* (2013.01); *H04N 13/0456* (2013.01)

(58) Field of Classification Search
None
See application file for complete search history.

(56) References Cited

U.S. PATENT DOCUMENTS

| | | | | |
|---|---|---|---|---|
| 6,795,068 | B1* | 9/2004 | Marks | G06F 3/0304 345/419 |
| 8,154,473 | B2* | 4/2012 | Engel et al. | 345/4 |
| 8,325,181 | B1* | 12/2012 | Reisman | G06F 3/0425 345/173 |
| 2003/0128242 | A1* | 7/2003 | Gordon | 345/848 |
| 2004/0101206 | A1* | 5/2004 | Morimoto et al. | 382/254 |
| 2006/0143020 | A1* | 6/2006 | Zaima | 705/1 |
| 2007/0146325 | A1* | 6/2007 | Poston | G06F 3/0317 345/163 |

(Continued)

FOREIGN PATENT DOCUMENTS

| | | |
|---|---|---|
| EP | 1549084 | 6/2005 |
| WO | 03/010653 | 2/2003 |

OTHER PUBLICATIONS

Steinicke et al, "Interscopic User Interface Concepts for Fish Tank Virtual Reality Systems", IEEE VR Conf., pp. 27-34, 2007.*

(Continued)

*Primary Examiner* — Ulka Chauhan
*Assistant Examiner* — Patrick F Valdez
(74) *Attorney, Agent, or Firm* — Lee Hong Degerman Kang & Waimey; Jonathan Kang; Jeffrey Lotspeich

(57) ABSTRACT

An electronic device and a contents generation method thereof are provided. A first mode and a second mode are provided. In the first mode, a position of at least one object is determined in response to depth information of the at least one object and the at least one object is displayed at the determined position. In the second mode, contents including the at least one object are displayed as a stereoscopic image. Conversion between the first mode and the second mode is controlled on the basis of a motion of the electronic device.

10 Claims, 15 Drawing Sheets

(56) References Cited

U.S. PATENT DOCUMENTS

| | | | |
|---|---|---|---|
| 2008/0092110 A1* | 4/2008 | Kawahara et al. | 717/105 |
| 2008/0094398 A1* | 4/2008 | Ng | G06F 3/0486 345/427 |
| 2008/0104536 A1* | 5/2008 | Mori | G06F 9/4443 715/798 |
| 2008/0143716 A1 | 6/2008 | Hsieh et al. | |
| 2008/0278640 A1* | 11/2008 | Ijzerman et al. | 349/15 |
| 2009/0002368 A1 | 1/2009 | Vitikainen et al. | |
| 2009/0251492 A1* | 10/2009 | Ohnishi | G06T 11/60 345/676 |
| 2010/0245345 A1* | 9/2010 | Tomisawa et al. | 345/419 |
| 2010/0323609 A1* | 12/2010 | Aramaki | 455/3.01 |
| 2011/0157155 A1* | 6/2011 | Turner | G06T 19/00 345/419 |
| 2011/0164029 A1* | 7/2011 | King | G06F 3/04883 345/419 |
| 2012/0011256 A1* | 1/2012 | Masuda et al. | 709/227 |
| 2012/0030569 A1* | 2/2012 | Migos et al. | 715/702 |
| 2012/0036433 A1* | 2/2012 | Zimmer | G06T 15/20 715/702 |
| 2012/0176413 A1* | 7/2012 | Kulik et al. | 345/659 |

OTHER PUBLICATIONS

Valkov et al, "2D Touching of 3D Stereoscopic Objects", ACM CHI 2011, pp. 1353-1362, May 2011.*

Steinicke et al, "Towards Applicable 3D User Interfaces for Everyday Working Environments", IFIP International Federation for Information Processing, LNCS 4662, Part I, pp. 546-559, 2007.*

Schoning et al, "Bimanual Interaction with Interscopic Multi-Touch Surfaces", IFIP International Federation for Information Processing, LNCS 5727, Part II, pp. 40-53, 2009.*

Mollers et al, "Direct Manipulation and the Third Dimension: Co-Planar Dragging on 3D Displays", ACM, ITS'12, Nov. 2012.*

European Patent Office Application Serial No. 12005041.4, Search Report dated Nov. 4, 2015, 7 pages.

* cited by examiner

FIG. 5
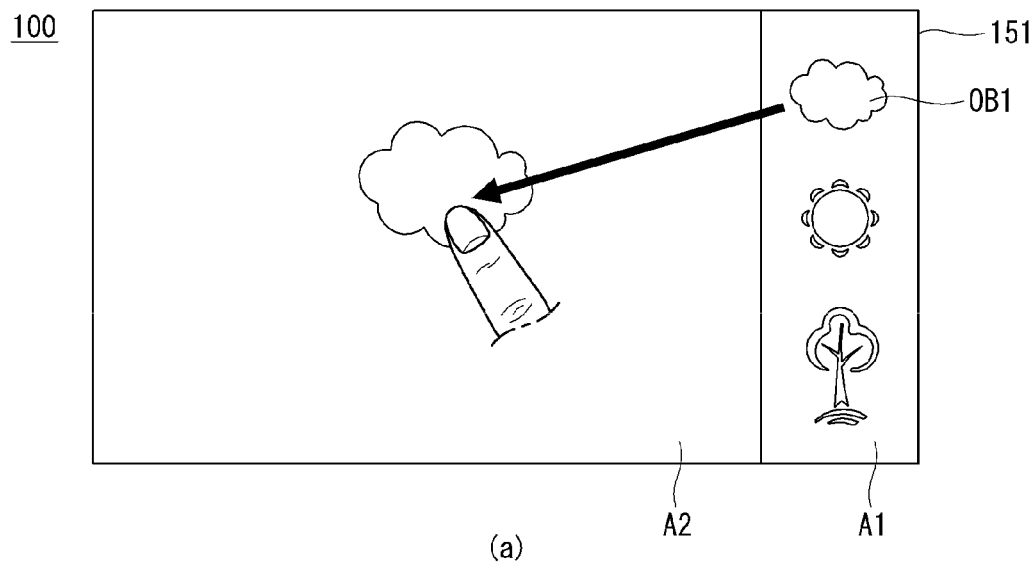
(a)
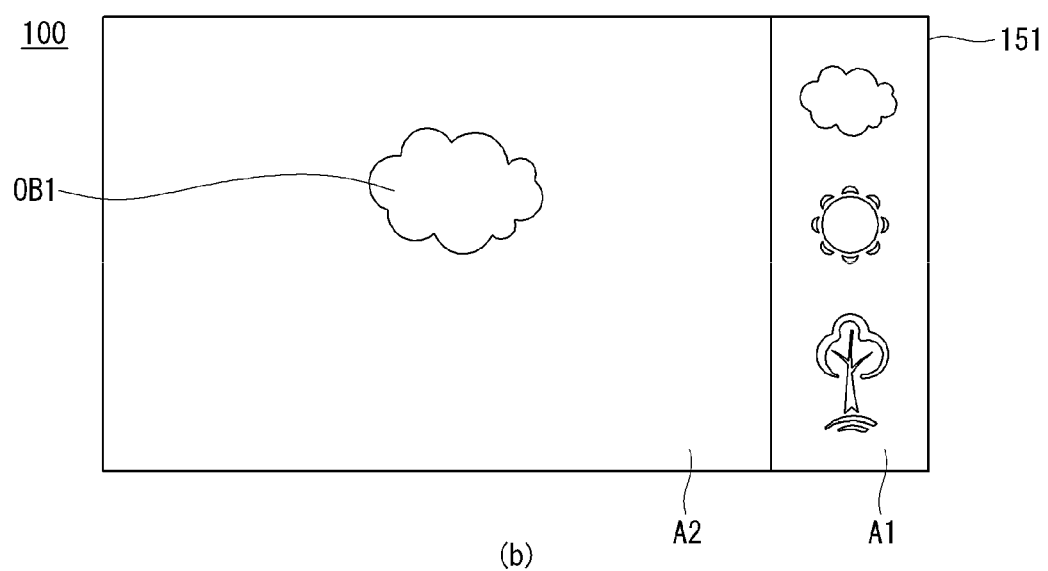
(b)

FIG. 6
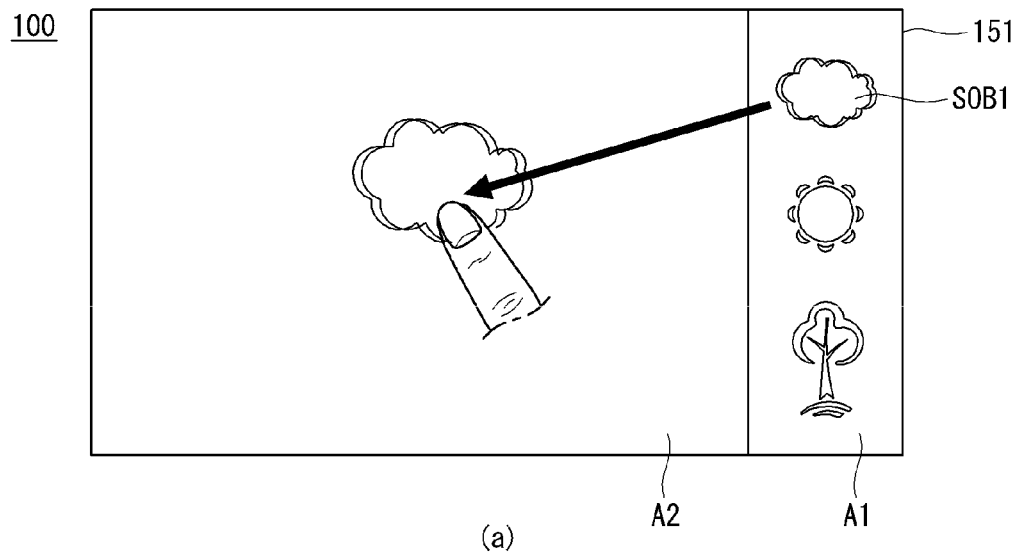
(a)
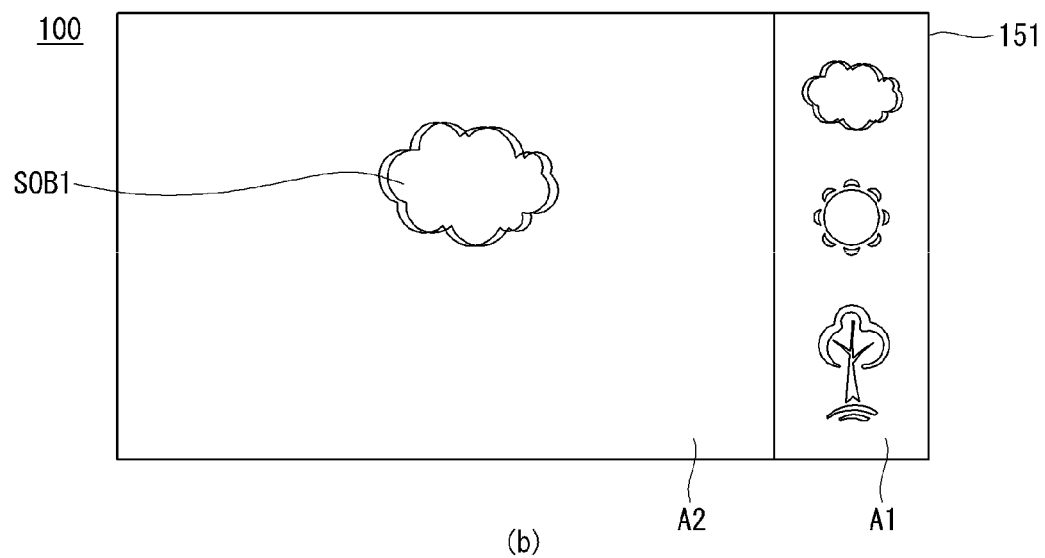
(b)

FIG. 7
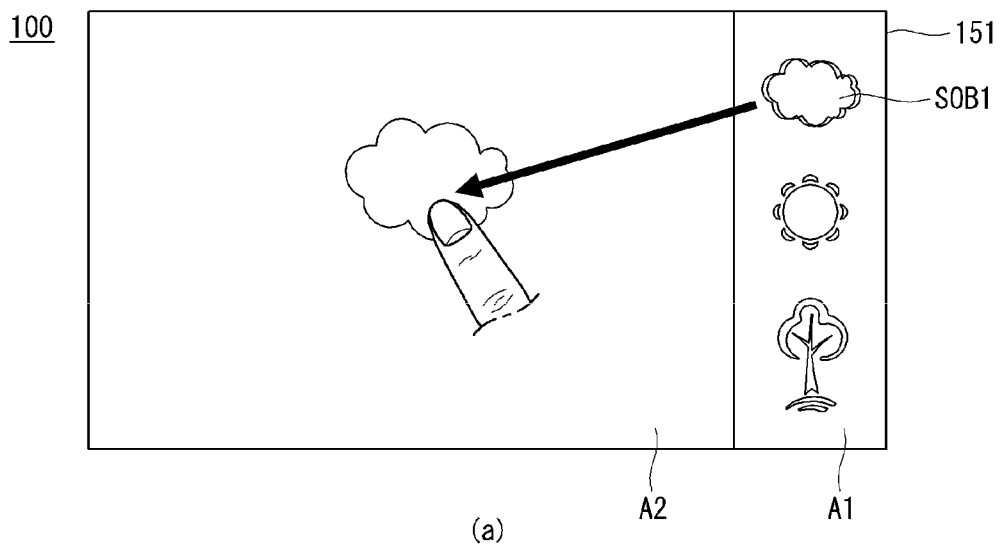
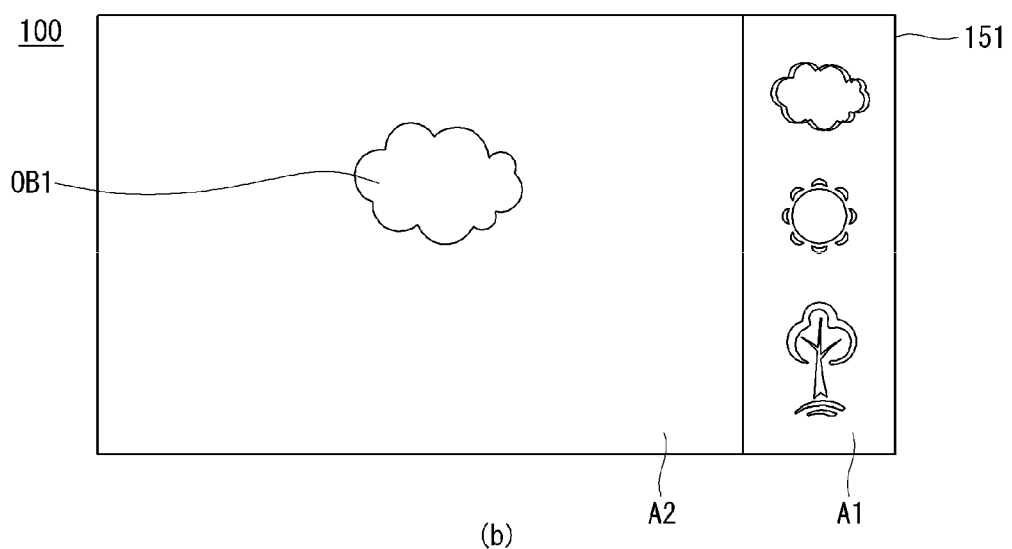

FIG. 10
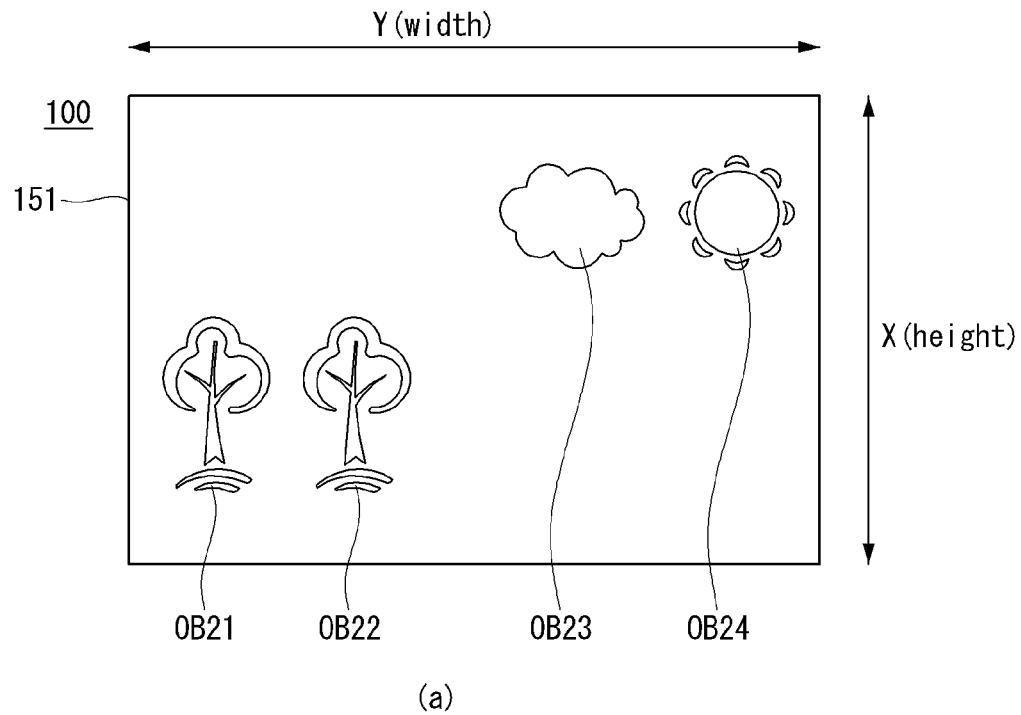
(a)
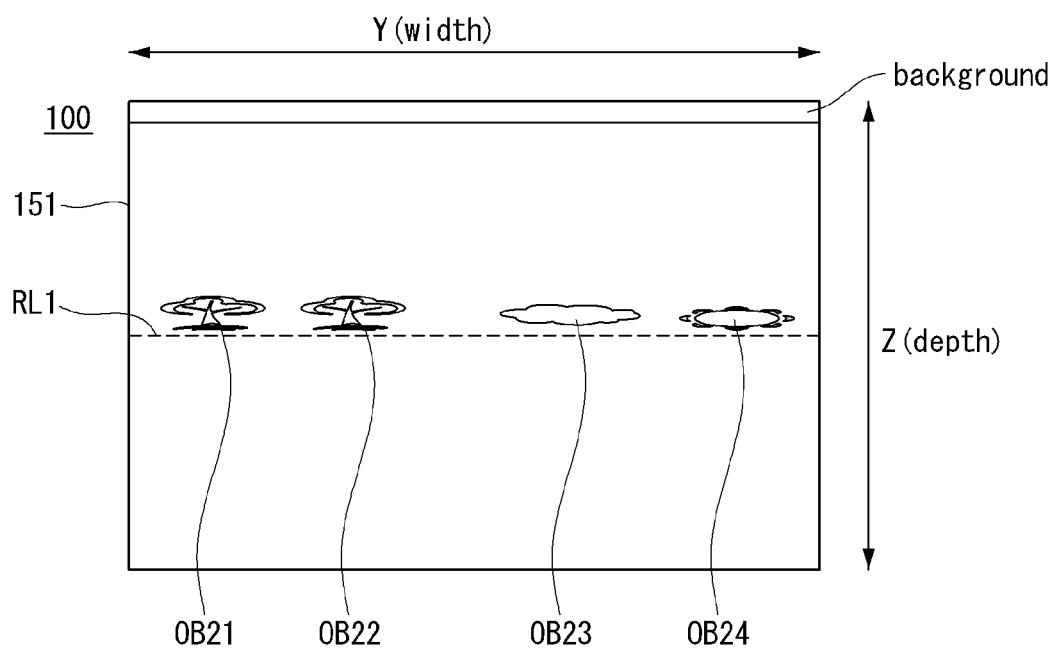
(b)

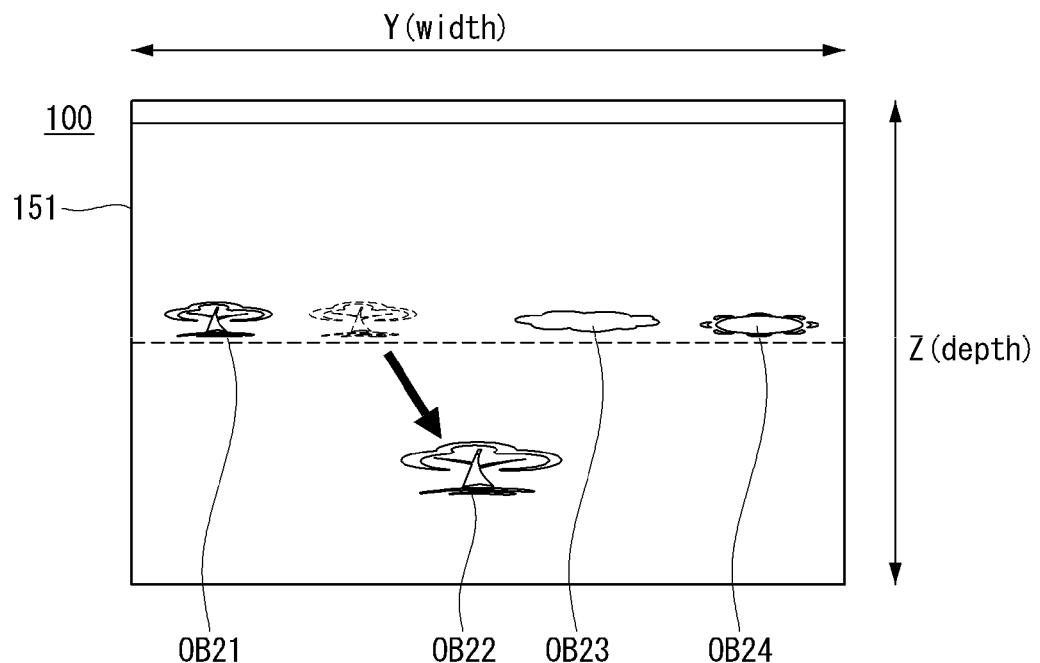
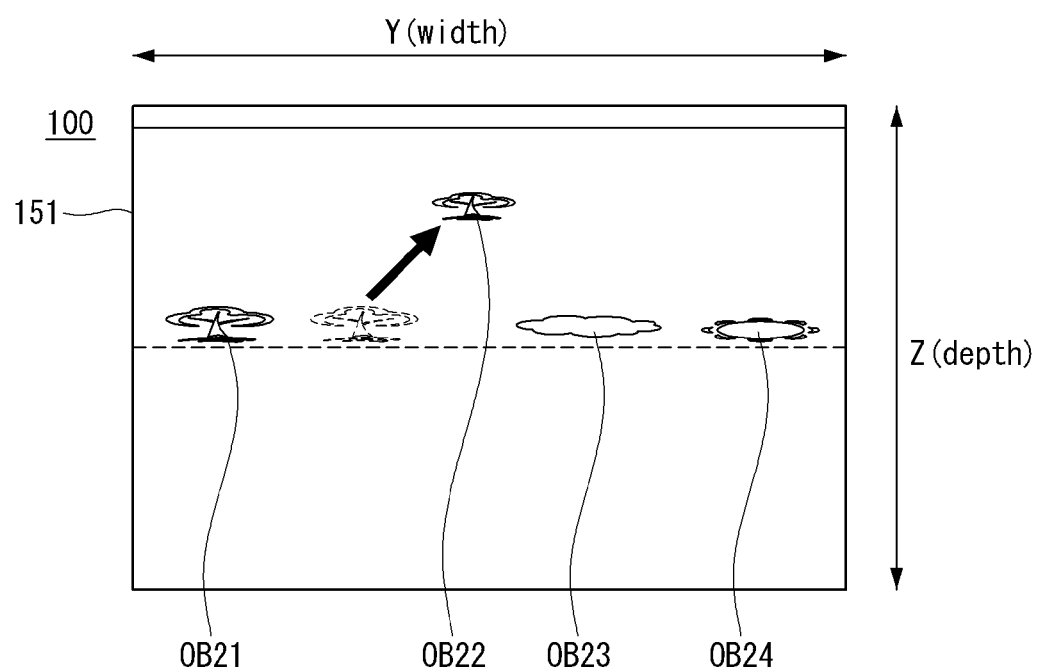

FIG. 16
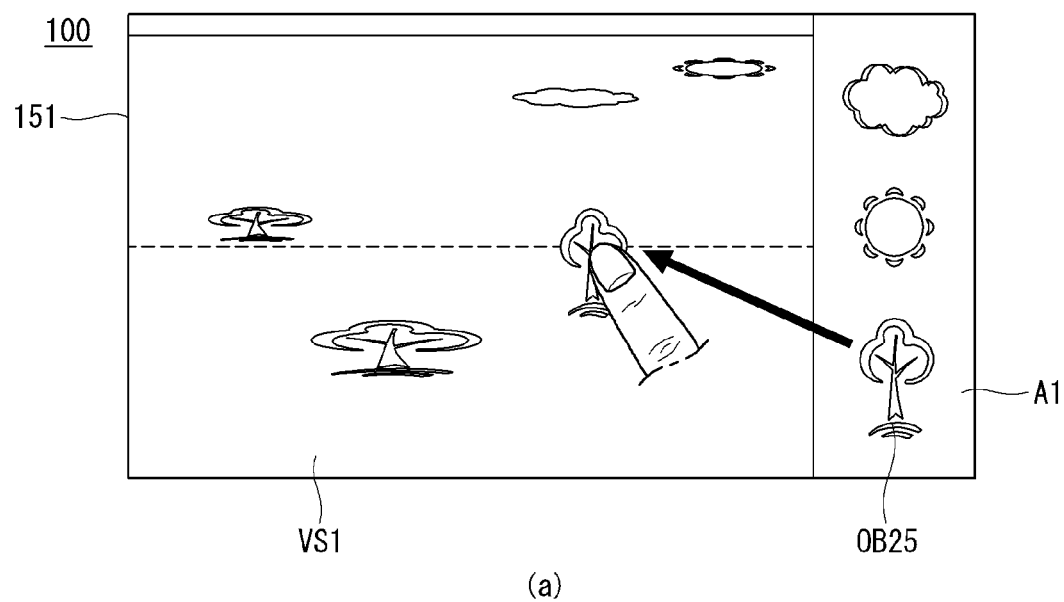
(a)
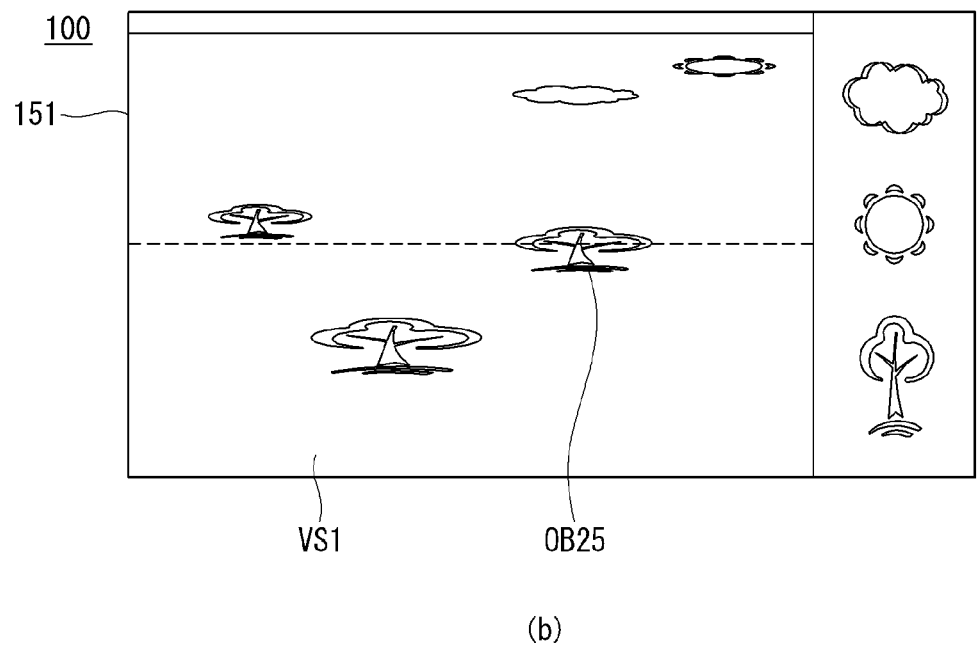
(b)

ELECTRONIC DEVICE AND CONTENTS GENERATION METHOD THEREOF

CROSS REFERENCE TO RELATED APPLICATIONS

Pursuant to 35 U.S.C. §119(a), this application claims the benefit of earlier filing date and right of priority to Korean Patent Application No. 10-2011-0095113, filed on Sep. 21, 2011, the contents of which are hereby incorporated by reference in its entirety.

FIELD

The present invention relates to an electronic device and a contents generation method thereof.

BACKGROUND

Electronic devices may be classified as mobile terminals and stationary terminals. The mobile terminals may be classified into handheld terminals or vehicle mount terminals based on whether users can personally carry the terminals.

With recent increase of electronic devices with a function of supporting stereoscopic image display, user's desires to enjoy a variety of stereoscopic contents have also increased.

However, it is difficult to enjoy various 3D contents because supply of a high percent of 3D contents still depends on external contents providers.

Accordingly, modification of a structural part and/or a software part of an electronic device is considered such that a user can freely produce and distribute 3D contents using the electronic device.

SUMMARY

An electronic device in accordance with one aspect of the present invention includes A display module equipped with a panel for generating stereoscopic vision; and a controller configured to enter a first mode for editing contents, display an object included in the contents at a position determined in response to depth information of the object, and change the depth information of the object in response to movement of the object.

An electronic device in accordance with another aspect of the present invention includes a sensing unit configured to sense a motion of the electronic device; and a display module equipped with a panel for generating stereoscopic vision; and a controller configured to providing a first mode for displaying an object included in a contents at a position determined in response to depth information of the object and a second mode for displaying the contents as a stereoscopic image, and control switching between the first mode and the second mode on the basis of the motion of the electronic device.

An electronic device in accordance with another aspect of the present invention includes a display module equipped with a panel for generating stereoscopic vision; and a controller configured to provide a first area in which at least one stereoscopic object is displayed and a second area in which a preview image of contents is displayed through the display module, and when a stereoscopic object selected from the first area is copied from the first area into the second area, display the selected stereoscopic object as 2D object in the second area.

A method for generating contents in an electronic device in accordance with one aspect of the present invention includes displaying an object at a position determined according to a distance between the object and a predetermined reference line, wherein the distance between the object and the predetermined reference line is determined in response to depth information of the object; and displaying contents including the object as a stereoscopic image when a specific user input is received by a motion of the electronic device.

BRIEF DESCRIPTION OF THE DRAWINGS

The accompanying drawings, which are included to provide a further understanding of described embodiments of the present invention and are incorporated in and constitute a part of this specification, illustrate embodiments of the present invention and together with the description serve to explain aspects and features of the present invention.

FIG. 5 illustrates an example of selecting an object included in contents in the electronic device 100 according to the first embodiment of the present invention;

FIGS. 6 and 7 illustrate examples of adding a stereoscopic object to contents in the electronic device 100 according to the first embodiment of the present invention;

FIG. 10 illustrates an exemplary image in a first mode when an object included in contents is a 2D object in the electronic device 100 according to the first embodiment of the present invention;

FIGS. 11 and 12 illustrate examples of changing depth information of an object in a virtual stereoscopic space in the electronic device 100 according to the first embodiment of the present invention;

FIG. 16 illustrates an example of adding contents in the first mode in the electronic device 100 according to the first embodiment of the present invention;

DETAILED DESCRIPTION

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

In the following description, suffixes "module" and "unit" are given to components of the electronic device in consideration of only facilitation of description and do not have meanings or functions discriminated from each other.

The electronic device described in the specification may include a smart phone, laptop computer, a digital broadcasting terminal, a personal digital assistant (PDA), a portable multimedia player (PMP), a digital TV, a desktop computer, a set-top box, a digital camera, and a navigation system, for example.

Figure 1:
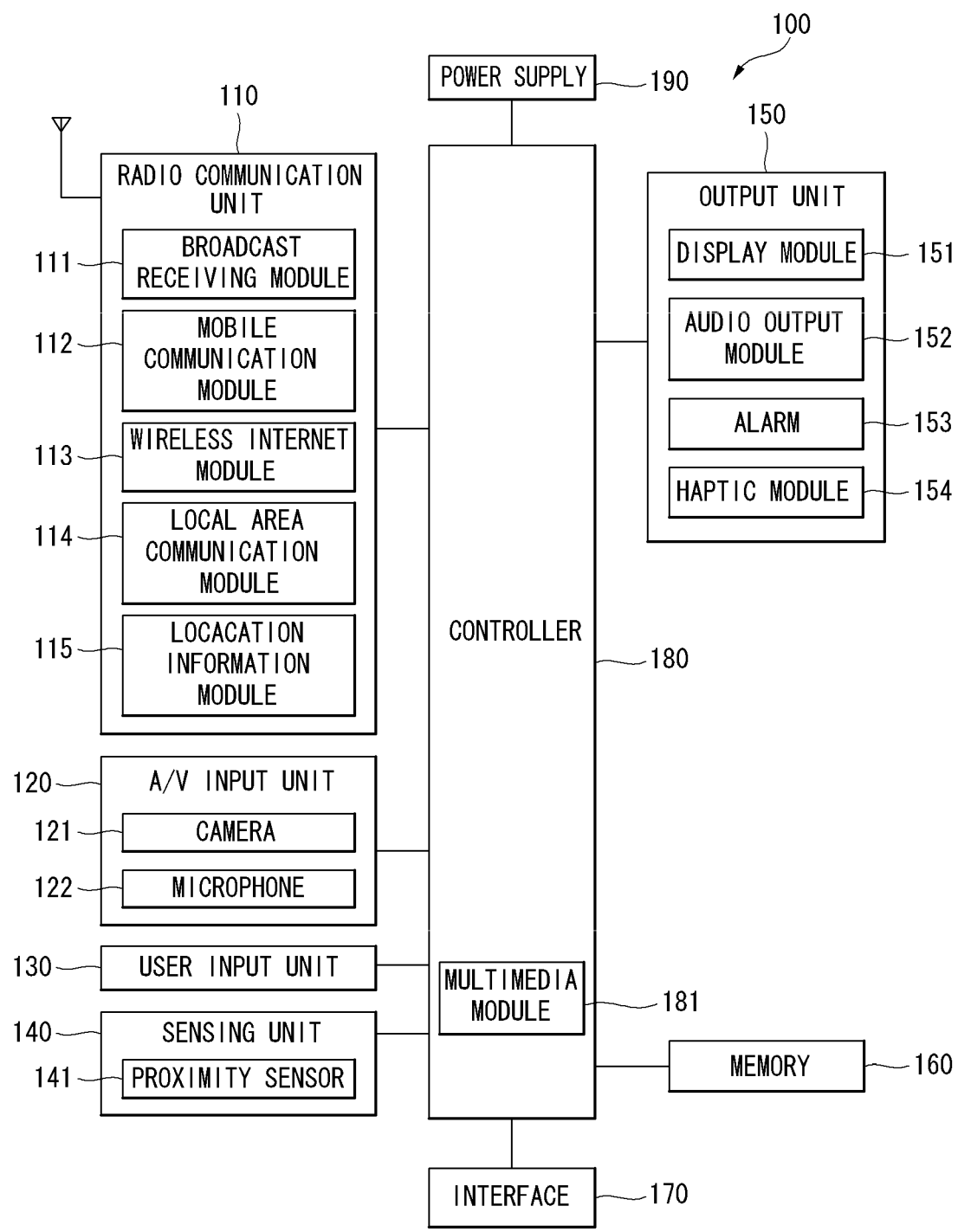
FIG. 1 is a block diagram of a mobile terminal according to an embodiment of the present invention.

FIG. 1 is a block diagram of an electronic device 100 according to an embodiment of the present invention. Other embodiments, configurations and arrangements may also be provided. As shown, the electronic device 100 may include a radio communication unit 110, an audio/video (A/V) input unit 120, a user input unit 130, a sensing unit 140, an output unit 150, a memory 160, an interface 170, a controller 180, and a power supply 190. Not all of the components shown in FIG. 1 may be essential parts and the number of components included in the electronic device 100 may be varied. The components of the electronic device 100 will now be described.

The communication unit 110 can include at least one module that enables communication between the electronic device 100 and a communication system or between the electronic device 100 and a network in which the electronic device 100 is located. For example, the communication unit 110 can include a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel.

The broadcasting channel can include a satellite channel and a terrestrial channel. The broadcasting management server can be a server that generates and transmits broadcasting signals and/or broadcasting related information or a server that receives previously created broadcasting signals and/or broadcasting related information and transmits the broadcasting signals and/or broadcasting related information to the electronic device. The broadcasting signals can include not only TV broadcasting signals, radio broadcasting signals and data broadcasting signals but also signals in the form of combination of a TV broadcasting signal and a radio broadcasting signal.

The broadcasting related information can be information on a broadcasting channel, a broadcasting program or a broadcasting service provider. The broadcasting related information can be provided even through a mobile communication network. In this case, the broadcasting related information can be received by the mobile communication module 112.

The broadcasting related information can exist in various forms. For example, the broadcasting related information can exist in the form of electronic program guide (EPG) of digital multimedia broadcasting (DMB) or in the form of electronic service guide (ESG) of digital video broadcast-handheld (DVB-H).

The broadcasting receiving module 111 receives broadcasting signals using various broadcasting systems. Particularly, the broadcasting receiving module 111 can receive digital broadcasting signals using digital broadcasting systems such as digital multimedia broadcasting-terrestrial (DMB-T), digital multimedia broadcasting-satellite (DMB-S), media forward link only (MediaFLO), DVB-H and integrated services digital broadcast-terrestrial (ISDB-T) systems. The broadcasting receiving module 111 can be constructed to be suited to broadcasting systems providing broadcasting signals other than the above-described digital broadcasting systems.

The broadcasting signals and/or broadcasting related information received through the broadcasting receiving module 111 can be stored in the memory 160.

The mobile communication module 112 transmits/receives a radio signal to/from at least one of a base station, an external device and a server on a mobile communication network. The radio signal can include a voice call signal, a video telephony call signal or data in various forms according to transmission and receiving of text/multimedia messages.

The wireless Internet module 113 means a module for wireless Internet access and can be included in the electronic device 100 or externally attached to the electronic device 100. Wireless LAN (WLAN) (Wi-Fi), wireless broadband (Wibro), world interoperability for microwave access (Wimax), high speed downlink packet access (HSDPA) and so on can be used as a wireless Internet technique.

The local area communication module 114 means a module for local area communication. Bluetooth, radio frequency identification (RFID), infrared data association (IrDA), ultra wideband (UWB) and ZigBee can be used as a local area communication technique.

The position information module 115 confirms or obtains the position of the electronic device. A global positioning system (GPS) module is a representative example of the position information module 115. According to the current technology, the GPS module 115 can calculate information on distances between one point (object) and at least three satellites and information on the time when the distance information is measured and apply trigonometry to the obtained distance information to obtain three-dimensional position information on the point (object) according to latitude, longitude and altitude at a predetermined time. Furthermore, a method of calculating position and time information using three satellites and correcting the calculated position and time information using another satellite is also used. In addition, the GPS module 115 continuously calculates the current position in real time and calculates velocity information using the position information.

Referring to FIG. 1, the A/V input unit 120 is used to input an audio signal or a video signal and can include a camera 121 and a microphone 122. The camera 121 processes image frames of still images or moving images obtained by an image sensor in a video telephony mode or a photographing mode. The processed image frames can be displayed on a display unit 151.

The image frames processed by the camera 121 can be stored in the memory 160 or transmitted to an external device through the communication unit 110. The electronic device 100 can include at least two cameras according to constitution of the electronic device 100.

The microphone 122 receives an external audio signal in a call mode, a recording mode or a speed recognition mode and processes the received audio signal into electric audio data. The audio data can be converted into a form that can be transmitted to a mobile communication base station through the mobile communication module 112 and output in the call mode. The microphone 122 can employ various noise removal algorithms for removing noise generated when the external audio signal is received.

The user input unit 130 receives input data for controlling the operation of the electronic device 100 from a user. The user input unit 130 can include a keypad, a dome switch, a touch pad (constant voltage/capacitance), jog wheel, jog switch and so on.

The sensing unit 140 senses the current state of the electronic device 100, such as open/close state of the electronic device 100, the position of the electronic device 100, whether a user touches the electronic device 100, the direction of the electronic device 100 and acceleration/deceleration of the electronic device 100 and generates a sensing signal for controlling the operation of the electronic device 100. For example, the sensing unit 140 can sense whether a slide phone is opened or closed when the electronic device 100 is the slide phone. Furthermore, the sensing unit 140 can sense whether the power supply 190 supplies power and whether the interface 170 is connected to an external device. The sensing unit 140 can include a proximity sensor.

The output unit 150 generates visual, auditory or tactile output and can include the display unit 151, an audio output module 152, an alarm 153 and a haptic module 154.

The display unit 151 displays information processed by the electronic device 100. For example, the display unit 151 displays UI or graphic user interface (GUI) related to a telephone call when the electronic device is in the call mode. The display unit 151 displays a captured or/and received image, UI or GUI when the electronic device 100 is in the video telephony mode or the photographing mode.

The display unit 151 can include at least one of a liquid crystal display, a thin film transistor liquid crystal display, an organic light-emitting diode display, a flexible display and a three-dimensional display.

Some of these displays can be of a transparent type or a light transmission type. This can be referred to as a transparent display. The transparent display includes a transparent liquid crystal display. The rear structure of the display unit 151 can also be of the light transmission type. According to this structure, a user can see an object located behind the body of the electronic device 100 through an area of the body of the electronic device 100, which is occupied by the display unit 151.

The electronic device 100 can include at least two display units 151 according to constitution of the electronic device 100. For example, the electronic device 100 can include a plurality of displays that are arranged on a single face at a predetermined distance or integrated. Otherwise, the plurality of displays can be arranged on different sides.

In the case where the display unit 151 and a sensor sensing touch (referred to as a touch sensor hereinafter) form a layered structure, which is referred to as a touch screen hereinafter, the display unit 151 can be used as an input device in addition to an output device. The touch sensor can be in the form of a touch film, a touch sheet and a touch pad, for example.

The touch sensor can be constructed such that it converts a variation in pressure applied to a specific portion of the display unit 151 or a variation in capacitance generated at a specific portion of the display unit 151 into an electric input signal. The touch sensor can be constructed such that it can sense pressure of touch as well as the position and area of touch.

When touch input is applied to the touch sensor, a signal corresponding to the touch input is transmitted to a touch controller. The touch controller processes the signal and transmits data corresponding to the processed signal to the controller 180. Accordingly, the controller 180 can detect a touched portion of the display 151.

Referring to FIG. 1, the proximity sensor 141 can be located in an internal region of the electronic device, surrounded by the touch screen, or near the touch screen. The proximity sensor senses an object approaching a predetermined sensing face or an object located near the proximity sensor using electromagnetic force or infrared rays without having mechanical contact. The proximity sensor has lifetime longer than that of a contact sensor and has wide application.

The proximity sensor includes a transmission type photoelectric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

A capacitive touch screen is constructed such that proximity of a pointer is detected through a variation in an electric field according to the proximity of the pointer. In this case, the touch screen (touch sensor) can be classified as a proximity sensor.

For convenience of explanation, an action of approaching the pointer to the touch screen while the pointer it not being in contact with the touch screen such that location of the pointer on the touch screen is recognized is referred to as "proximity touch" and an action of bring the pointer into contact with the touch screen is referred to as "contact touch" in the following description. A proximity touch point of the pointer on the touch screen means a point of the touch screen to which the pointer corresponds perpendicularly to the touch screen when the pointer proximity-touches the touch screen.

The proximity sensor senses proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can be displayed on the touch screen.

The audio output module 152 can output audio data received from the communication unit 110 or stored in the memory 160 in a call signal receiving mode, a telephone call mode or a recording mode, a speech recognition mode and a broadcasting receiving mode. The audio output module 152 outputs audio signals related to functions (for example, a call signal incoming tone, a message incoming tone, etc.) performed in the electronic device 100. The audio output module 152 can include a receiver, a speaker, a buzzer, etc.

The alarm 153 outputs a signal for indicating generation of an event of the electronic device 100. Examples of events generated in the electronic device include receiving of a call signal, receiving of a message, input of a key signal, input of touch, etc. The alarm 153 can output signals in forms different from video signals or audio signals, for example, a signal for indicating generation of an event through vibration. The video signals or the audio signals can be also output through the display unit 151 or the audio output module 152.

The haptic module 154 generates various haptic effects that the user can feel. A representative example of the haptic effects is vibration. The intensity and pattern of vibration generated by the haptic module 154 can be controlled. For example, different vibrations can be combined and output or sequentially output.

The haptic module 154 can generate a variety of haptic effects including an effect of stimulus according to arrangement of pins vertically moving for a contact skin face, an effect of stimulus according to jet force or sucking force of air through a jet hole or a sucking hole, an effect of stimulus rubbing the skin, an effect of stimulus according to contact of an electrode, an effect of stimulus using electrostatic force and an effect according to reproduction of cold and warmth using an element capable of absorbing or radiating heat in addition to vibrations.

The haptic module 154 can not only transmit haptic effects through direct contact but also allow the user to feel haptic effects through kinesthetic sense of his fingers or arms. The electronic device 100 can include at least two haptic modules 154 according to constitution of the electronic device.

The memory 160 can store a program for the operation of the controller 180 and temporarily store input/output data (for example, phone book, messages, still images, moving images, etc.). The memory 160 can store data about vibrations and sounds in various patterns, which are output from when a touch input is applied to the touch screen.

The memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The electronic device 100 can operate in relation to a web storage performing the storing function of the memory 160 on the Internet.

The interface 170 serves as a path to all external devices connected to the electronic device 100. The interface 170 receives data from the external devices or power and transmits the data or power to the internal components of the electronic device 100 or transmits data of the electronic device 100 to the external devices. The interface 170 can include a wired/wireless headset port, an external charger port, a wired/wireless data port, a memory card port, a port for connecting a device having a user identification module, an audio I/O port, a video I/O port, an earphone port, etc., for example.

An identification module is a chip that stores information for authenticating the authority to use the electronic device 100 and can include a user identify module (UIM), a subscriber identify module (SIM) and a universal subscriber identify module (USIM). A device (referred to as an identification device hereinafter) including the identification module can be manufactured in the form of a smart card. Accordingly, the identification device can be connected to the electronic device 100 through a port.

The interface 170 can serve as a path through which power from an external cradle is provided to the electronic device 100 when the electronic device 100 is connected to the external cradle or a path through which various command signals inputted by the user through the cradle to the electronic device 100. The various command signals or power input from the cradle can be used as a signal for confirming whether the electronic device 100 is correctly set in the cradle.

The controller 180 controls the overall operation of the electronic device. For example, the controller 180 performs control and processing for voice communication, data communication and video telephony. The controller 180 can include a multimedia module 181 for playing multimedia. The multimedia module 181 can be included in the controller 180 or separated from the controller 180.

The controller 180 can perform a pattern recognition process capable of recognizing handwriting input or picture-drawing input applied to the touch screen as characters or images.

The power supply 190 receives external power and internal power and provides power required for the operations of the components of the electronic device under the control of the controller 180.

Various embodiments of the present invention can be implemented in a computer or similar device readable recording medium using software, hardware or a combination thereof, for example.

According to hardware implementation, the embodiments of the present invention can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. In some cases, the embodiments can be implemented by the controller 180.

According to software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

Figure 2:
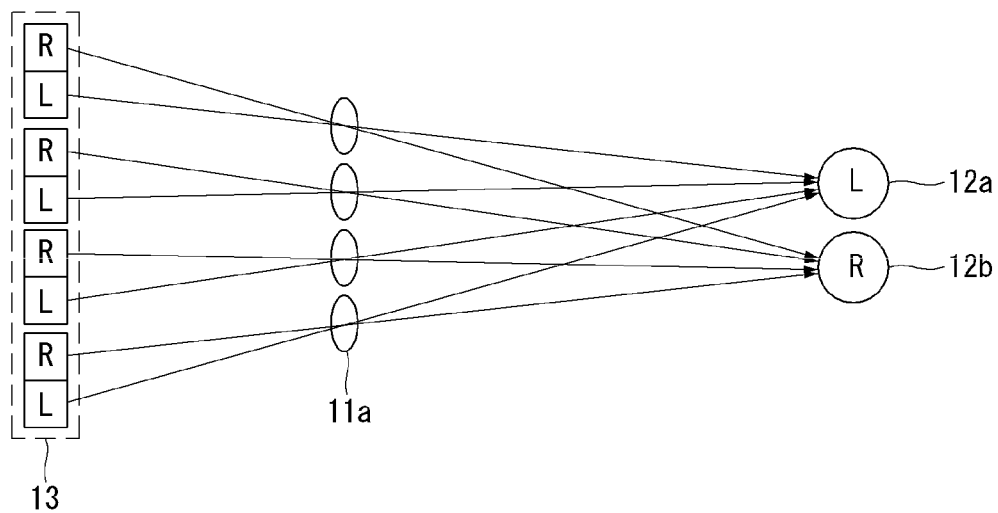
FIGS. 2 and 3 are diagrams for explaining a stereoscopic image display method using binocular parallax according to embodiments of the present invention.
Figure 3:
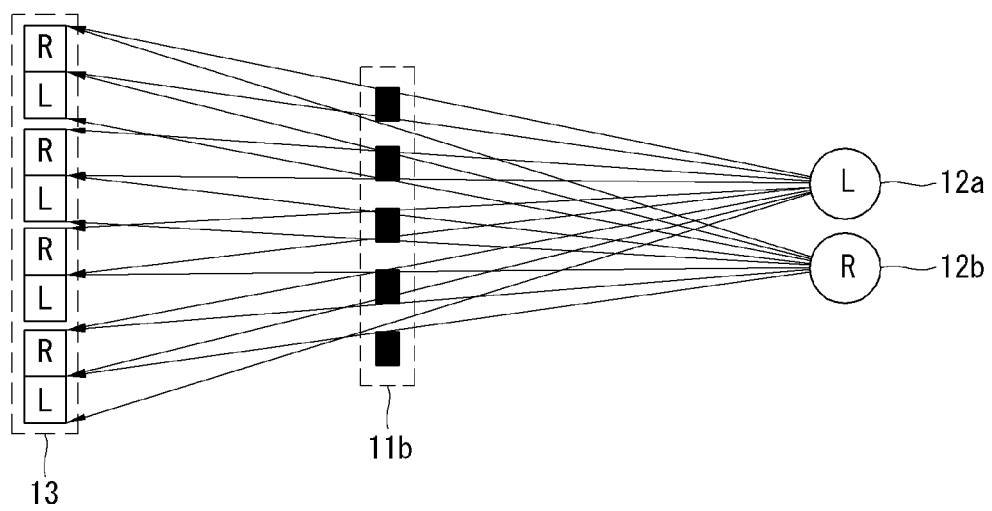

FIGS. 2 and 3 are diagrams for describing a stereoscopic image display method using binocular parallax according to embodiments of the present invention. FIG. 2 illustrates a method using a lenticular lens array and FIG. 3 illustrates a method using a parallax barrier.

Binocular parallax refers to difference in the apparent position of an object viewed along two different lines of sight. When an image seen by the left eye of a person and an image seen by his right eye are composed in the brain of the person, the person sees the composed image as a stereoscopic image.

In the following description, visual perception of depth due to human binocular parallax is referred to as 'stereoscopic vision' and an image causing stereoscopic vision is referred to as 'stereoscopic image'. In addition, when a specific object included in an image causes stereoscopic vision, this object is referred to as "stereoscopic object'. Further, contents produced to cause stereoscopic vision is called 'stereoscopic contents'. The stereoscopic contents may include stereoscopic images, stereoscopic objects, etc.

Stereoscopic image display methods using binocular parallax are classified into stereoscopic display methods requiring special glasses and autostereoscopic display methods requiring no glasses.

The stereoscopic display methods include a method using colored glasses, polarizing glasses using shading effect due to a polarized light difference, field sequential glasses that alternately provide left and right images within the afterimage time of the eye, etc. In addition, there is a method using filters having different transmissivities for the left and right eyes of a user to obtain stereoscopic effect with respect to a horizontal motion according to a time difference of the visual system caused by a transmissivity difference.

The autostereoscopic display methods that obtain stereoscopic effect from an image display side rather than an observer include a method using a parallax barrier, a method using a lenticular lens, a method using a microlens array, etc.

Referring to FIG. 2, the display unit 151 includes a lenticular lens array 11a to display a stereoscopic image. The lenticular lens array 11a is located between the left and right eyes 12a and 12b and a display plane 13 on which pixels L to be input to the left eye 12a and pixels R to be input to the right eye 12b are alternately arranged in the horizontal direction, and provides optical discriminative directivity with respect to the pixels L to be input to the left eye 12a and the pixels R to be input to the right eye 12b. Accordingly, an image that has passed through the lenticular lens array 11a is separated and seen by the left eye 12a and the right eye 12b, and an image seen by the left eye 12a and an image seen by the right eye 12b are composed in the human brain to be seen as a stereoscopic image.

Referring to FIG. 3, the display module 151 for displaying a stereoscopic image includes a parallax barrier 11b in the form of a vertical lattice. The parallax barrier 11b is located between the left and right eyes 12a and 12b and the display plane 13 on which the pixels L to be input to the left eye 12a and the pixels R to be input to the right eye 12b are alternately arranged in the horizontal direction and includes vertically arranged apertures to allow an image to be separated and seen by the left eye 12a and the right eye 12b. Accordingly, an image seen by the left eye 12a and an image seen by the right eye 12b are composed in the human brain to be seen as a stereoscopic image. The parallax barrier 11b is turned on to separate an input image only when a stereoscopic image needs to be displayed and turned off to pass an input image without separating it when a 2D image needs to be displayed.

The above-mentioned stereoscopic image display methods have been described to explain embodiments of the present invention and the present invention is not limited thereto. The present invention can display stereoscopic images using binocular parallax through various methods in addition to the above-described methods.

Embodiments described in the specification can be implemented in the electronic device 100 described with reference to FIGS. 1, 2 and 3. The embodiments of the present invention will be described.

In the specification, the display unit 151 may include a panel for implementing a stereoscopic vision. This panel may have a structure for implementing a stereoscopic vision using one of a lenticular lens or a parallax barrier as described above.

In the following description, a state in which the panel included in the display unit 151 is activated in order to display an image displayed on a screen as a stereoscopic image is referred to as 'stereoscopic image display mode' and a state in which an image is displayed with the panel being inactivated is referred to as '2D image display mode'.

According to the embodiments of the present invention, the panel for implementing a stereoscopic vision can be locally activated or inactivated, and thus the display unit 151 may control the panel to drive the screen such that the screen locally operates in the stereoscopic image display mode or 2D image display mode.

Furthermore, the display unit 151 is assumed to be a touchscreen in the specification. As described above, the touchscreen 151 can execute both an information display function and an information input function. However, it is noted that the present invention is not limited thereto.

In the specification, a touch gesture means a gesture of directly touching the touchscreen 151 or proximity-touching the touchscreen 151 and a touch input means an input received according to the touch gesture.

The touch gesture is classified as tapping, drag, flicking, press, multi-touch, pinch-in, pinch-out, etc.

The tapping is a gesture of slightly pressing the touchscreen 151 and then releasing it and corresponds to a mouse click in a general computer.

The drag is a gesture of touching the touchscreen 151, moving the touch to a specific point and then releasing the touch. When an object is dragged, the object can be continuously moved in the dragging direction and displayed.

The flicking is a gesture of touching the touchscreen 151, moving the touch to a specific direction (to the top, bottom, left, right, or diagonal direction) and then releasing the touch. The electronic device 100 processes a specific operation on the basis of a flicking direction, velocity, etc. when receiving a touch input according to flicking. For example, the electronic device 100 can turn the pages of an e-book in the flicking direction.

The press is a gesture of touching the touchscreen 151 and continuously maintaining the touch for over a predetermined time.

The multi-touch is a gesture of simultaneously touching a plurality of points of the touchscreen 151.

The pinch-in is a gesture of dragging a plurality of pointers that is multi-touching the touchscreen 151 in a direction in which the points become closer. That is, the pinch-in corresponds to a drag that begins from at least one of multi-touched points on the touchscreen 151 and moves to a direction in which the multi-touched points become closer.

The pinch-out is a gesture of dragging a plurality of pointer that is multi-touching the touchscreen 151 in a direction in which the points become distant from one another. That is, the pinch-out corresponds to a drag that begins from at least one of multi-touched points on the touchscreen 151 and moves to a direction in which the multi-touched points become distant from one another.

In the specification, the sensing unit 140 may includes a gyroscope, an accelerometer, and a magnetic sensor.

The gyroscope can acquire the speed of revolution or angular velocity according to revolution of the electronic device 100 on the axis thereof. The accelerometer can sense gravitational acceleration according to a motion of the electronic device 100. The magnetic sensor can sense the orientation of the electronic device 100 like a compass.

The controller 180 can sense a motion of the electronic device 100 on the basis of at least one of the angular velocity obtained by the gyroscope of the sensing unit 130, the gravitational acceleration acquired by the accelerometer, and the orientation of the electronic device 100, sensed by the magnetic sensor. Here, the motion of the electronic device may include tilting, maintaining a horizontal state, rotation and the like of the electronic device.

A description will be given of a method for generating contents in the electronic device 100 and an operation of the electronic device 100 to implement the method according to a first embodiment of the present invention with reference to the attached drawings.

In the first embodiment of the present invention, for facilitation of description, at least one object is located in a virtual stereoscopic space in response to depth information of the object according to stereoscopic vision of the object. A mode of changing the depth information of each object using the location thereof in the virtual stereoscopic space is referred to 'first mode' and a mode of displaying a preview image of contents including at least one object as a stereoscopic image is referred to as 'second mode'.

Figure 4:
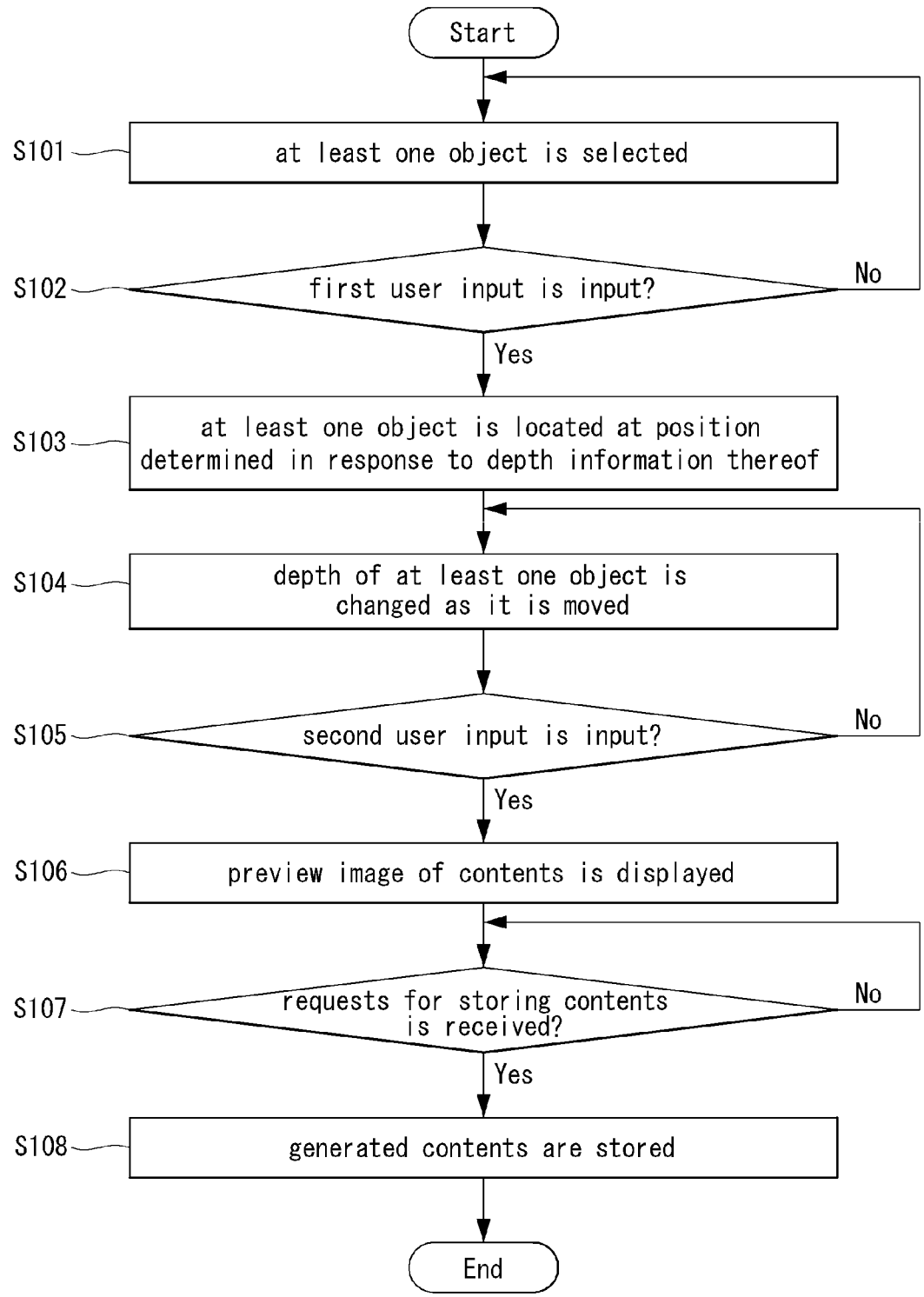
FIG. 4 is a flowchart illustrating a method for generating contents in an electronic device 100 according to a first embodiment of the present invention.

FIG. 4 is a flowchart illustrating the method for generating contents in the electronic device 100 according to the first embodiment of the present invention and FIGS. 5 to 16 are diagrams for describing the method for generating contents according to the first embodiment of the present invention.

Referring to FIG. 4, the controller 180 selects at least one object used to generate the contents on the basis of a user input and locates the selected object on a screen (S101).

The selected object may be an object previously stored in the memory 160 or an object downloaded from an external server through the radio communication unit 110. Further, the object may be a 3D object or a 2D object.

FIG. 5 illustrates an example of selecting an object included in contents.

Referring to FIG. 5(a), the controller 180 displays a list of objects available to generate the contents in a first area A1 of the screen on the basis of a user input.

Upon selection of one object OB1 from the object list and drag of the selected object OB1 to a second area A2, the controller 180 adds the object OB1 to the contents. That is, the controller 180 locates the selected object OB1 in the second area A2 used to edit contents, as shown in FIG. 5(b).

FIG. 5 illustrates an example of selecting an object used to generate contents and the present invention is not limited thereto. According to the present invention, the controller 180 can select an object used to generate contents on the basis of various user inputs.

In addition, while FIG. 5 illustrates an example of adding an object to contents, the controller 180 may delete some of the objects included in the contents from the contents on the basis of a user input according to the first embodiment of the present invention. That is, the controller 180 can remove an object selected by a user from objects arranged in the second area A2.

Referring back to FIG. 4, upon selection of objects used to generate the contents in S101, the controller 180 may change display characteristics of the selected objects on the basis of a user input. Here, the display characteristics may include a display size, display location, etc.

For instance, the controller 180 can change a display size of an object located on the screen to generate contents on the basis of a user input.

Further, the controller 180 can move the location of the object on the screen on the basis of a user input.

When the controller 180 selects a stereoscopic object to generate the contents in S101, the controller 180 can reflect depth information of the stereoscopic object in generation of the contents, or convert the stereoscopic object to a 2D object and include the 2D object in the contents. In the latter case, the controller 180 can change the depth of the stereoscopic object to 'depth 0' corresponding to a display plane to convert the selected stereoscopic object to a 2D object and include the 2D object in the contents.

FIGS. 6 and 7 illustrate examples of adding a stereoscopic object to contents.

Referring to FIG. 6(a), a stereoscopic object SOB1 selected by the user is dragged to the second area A2 for content addition. Accordingly, the controller 180 locates the dragged stereoscopic object SOB1 in the second area A2 as shown in FIG. 6(b). At this time, the controller 180 reflects the depth information of the stereoscopic object SOB1 in arrangement of the stereoscopic object SOB1 and displays the stereoscopic object SOB1 in the second area A2.

Referring to FIG. 7(a), the stereoscopic object SOB1 selected by the user is dragged to the second area A2 for content edition. Accordingly, the controller 180 can convert the selected stereoscopic object SOB1 to a 2D object OB1 and locate the 2D object OB1 in the second area A2 as shown in FIG. 7(b). That is, the controller 180 changes the depth of the selected stereoscopic object SOB1 to a value corresponding to the 2D object and arranges the 2D object in the second area A2.

Referring back to FIG. 4, upon selection of an image as an object used to generate the contents in S101, the controller 180 may extract at least one object from the selected image and use the object to generate the contents.

When objects are extracted from an image and used to generate contents as described above, it is possible to separately edit only a specific object in the event of contents edition. In other words, it is possible to move the location of the specific object in the contents or magnify/reduce only the specific object. Further, it is possible to separately control depth information of each object.

When an image selected as an object used to generate contents is a stereoscopic image, objects extracted from the image may be stereoscopic objects.

In this case, the controller 180 can also extract depth information of an object when extracting the object. Further, the controller 180 can arrange the extracted stereoscopic object in response to the extracted depth information, or convert the extracted stereoscopic object to a 2D object and arrange the 2D object.

Referring back to FIG. 4, upon reception of a first user input in the state that the at least one object included in the contents has been selected (S102), the controller 180 enters the first mode for changing the depth information of each object.

In the first mode, the controller 180 displays a virtual stereoscopic space for intuitively displaying the depth information of each object in a display area. In addition, the controller 180 determines a location of each object in the virtual stereoscopic space in response to the depth information of each object and arranges each object based on the determined location (S103).

In step S102, the first input can be generated through the following various methods.

The first user input can be generated according to a motion of the electronic device 100.

For example, the first user input can be input as the electronic device 100 rotates in a specific direction. That is, the controller 180 determines that the first user input is generated when sensing a rotating motion of the electronic device 100 to a specific direction through the sensing unit 140.

The first user input can be input as the position of the electronic device 100 is in a specific state such as a horizontal state. For this, the controller 180 can sense tilting of the electronic device 100 through the sensing unit 140 and determine the position of the electronic device 100 on the basis of the tilting state of the electronic device 100.

The first user input can be generated by manipulating a specific key button included in the user input unit 130.

Further, the first user input can be input by touting a specific region of the display area.

In addition, the first user input can be input by tapping a specific portion of the body of the electronic device 100. For example, the first user input can be input by tapping the backside of the body of the electronic device 100.

In step S103, the virtual stereoscopic space means a virtual space seen to the user according to binocular parallax of the user when an image is displayed in the stereoscopic image display mode.

Figure 8:
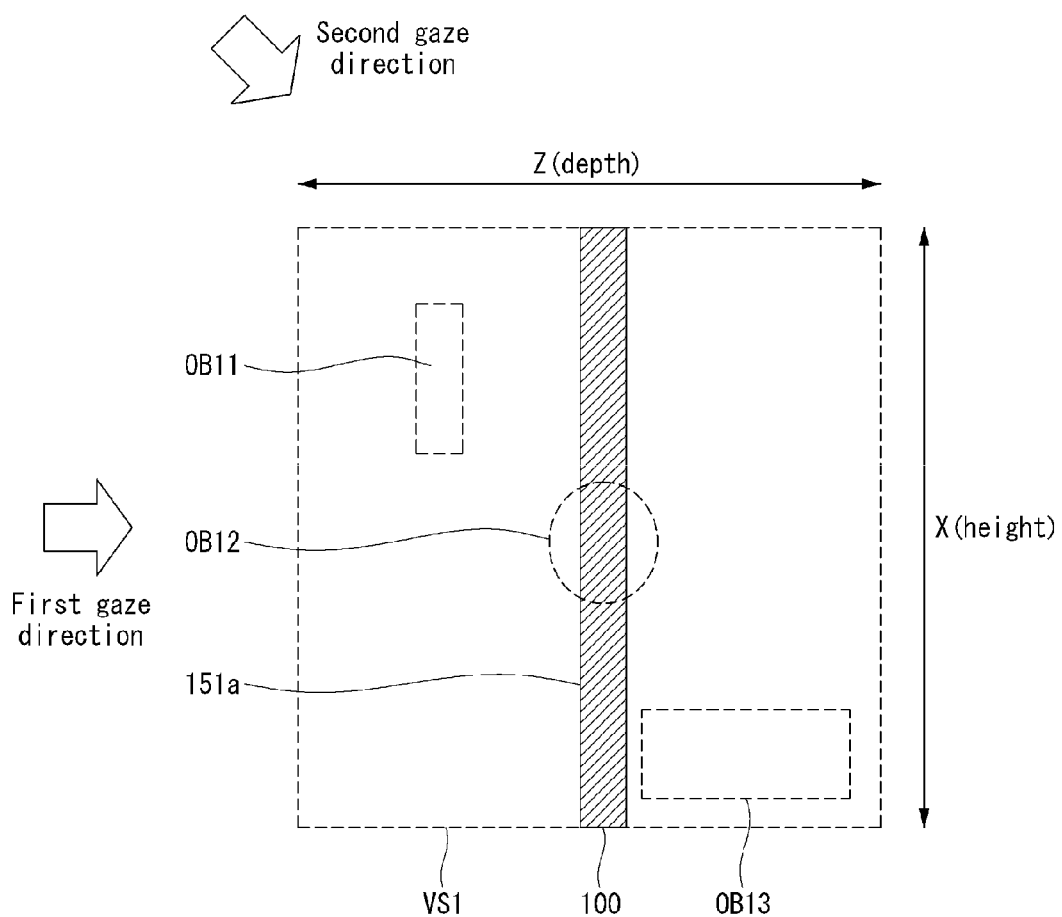
FIG. 8 is a diagram for explaining a virtual stereoscopic space according to the first embodiment of the present invention.

FIG. 8 is a diagram for explaining the virtual stereoscopic space, which shows an image of the virtual stereoscopic space, seen from the side.

Referring to FIG. 8, when a stereoscopic image including objects OB11, OB12 and OB13 is displayed in the display area in the stereoscopic image display mode, the stereoscopic image generates stereoscopic vision to make the objects OB11, OB12 and OB13 having different depths be seen to the user in a virtual stereoscopic space VS1 having a predetermined depth front from to rear on the basis of a display plane 151a.

According to the first embodiment of the present invention, the controller 180 visualizes an image when the user sees the virtual stereoscopic space VS1 in a specific direction and displays the image when entering the first mode.

Referring to FIG. 8, when the controller 180 visualizes an image of the stereoscopic space VS1 that the user sees in a first gaze direction, that is, the user looks straight in the eye, the user can recognize widths and heights of the objects OB11, OB12 and OB13 on the basis of their locations in the stereoscopic image. However, it is difficult to intuitively recognize the depths of the objects OB11, OB12 and OB13 on the basis of their locations in the stereoscopic image.

Accordingly, the first embodiment of the present invention supports intuitive recognition of the depths of the objects OB11, OB12 and OB13 on the basis of their locations in the stereoscopic image by visualizing the image of the virtual stereoscopic space VS1 that the user sees in a second gaze direction, that is, the user looks down, and displaying the image.

Figure 9:
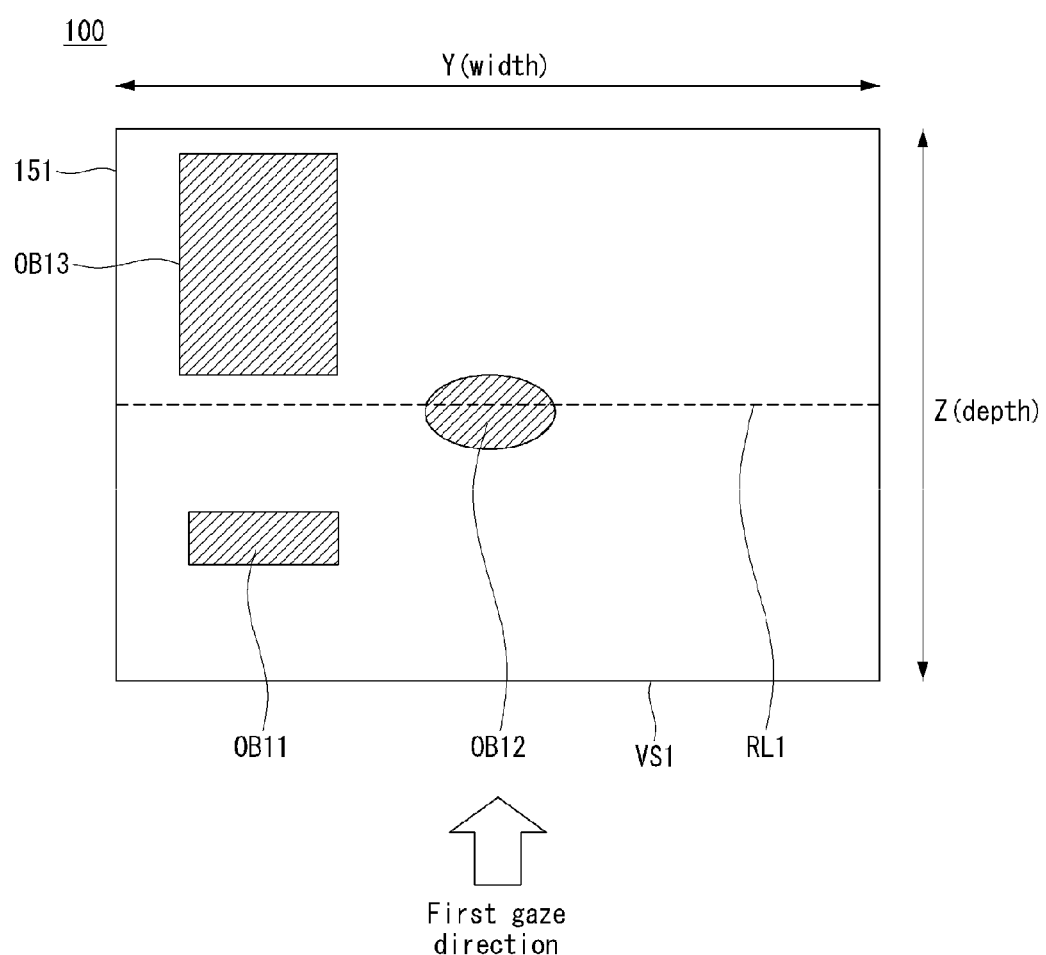
FIG. 9 illustrates an example of displaying a virtual stereoscopic space in the electronic device 100 according to the first embodiment of the present invention.

FIG. 9 illustrates an example of displaying an image of the virtual stereoscopic space, seen in the second gaze direction.

Referring to FIG. 9, the controller 180 displays the image of the virtual stereoscopic space VS1 shown in FIG. 8, which is seen in the second gaze direction, in the display area.

If the virtual stereoscopic space is seen in the second gaze direction, images, obtained when the objects OB11, OB12 and OB13 are rotated in the gaze direction, instead of their front images can be seen to the user. Accordingly, when the image of the virtual stereoscopic space, seen in the second gaze direction, is displayed on the screen, the objects OB11, OB12 and OB13 can be displayed as images when they are rotated in a specific direction according to the gaze direction.

It can be known from FIG. 9 that display positions of the objects OB11, OB12 and OB13 on the image of the virtual stereoscopic space VS1 seen in the second gaze direction are determined by the depth information of the objects OB11, OB12 and OB13. Further, it can be understood that relative positions of the objects OB11, OB12 and OB13 are determined by their relative depths.

For example, the first object OB11 is located below the second object OB12 in FIG. 9, and thus it can be known that the first object OB11 has depth information that makes the first object OB11 be seen as if it is located in front of the second object OB12.

In addition, since the third object OB13 is located above the second object OB12 in FIG. 9, it can be known that the third object OB13 has depth information that makes the third object OB13 be seen as if it is located behind the second object OB12.

As described above, when the image of the virtual stereoscopic space seen in the second gaze direction is displayed on the screen, the user can intuitively recognize depth information of each object on the basis of the location of each object in the virtual stereoscopic space.

According to the first embodiment of the present invention, the controller 180 can set a reference line in the display area in order to determine a display position of an object using the depth information of the object.

The reference line used to display depth information is a line connecting points at specific depths and is used as a standard for determination of a location of each object. In the first embodiment of the present invention, the reference line is assumed to be a line connecting points on the display plane, that is, a line connecting points at 'depth 0' for convenience of explanation.

According to the present invention, the controller 180 can allow the user to intuitively recognize the display plane by displaying the reference line set in the display area on the screen. Moreover, the controller 180 can allow the user to intuitively recognize a depth of each object in the virtual stereoscopic space on the basis of the display plane.

Referring to FIG. 9, the controller 180 display a reference line RL1 corresponding to the display plane 151a on the screen. The controller 180 determines distances between the reference line RL1 and the objects OB11, OB12 and OB13 in response to the depths of the objects OB11, OB12 and OB13 and arranges the objects OB11, OB12 and OB13 base on the determined distances.

Accordingly, the user can intuitively recognize that the depths of the first object OB11 and the third object OB13 have been set such that the first object OB11 is seen as if it is projected from the display plane and the third object OB13 is seen as if it is recessed from the display plane.

While the image of the virtual stereoscopic space is displayed on the screen on the assumption that the user sees the virtual stereoscopic space in the second gaze direction in FIGS. 8 and 9, it is noted that the present invention is not limited thereto.

Further, while the reference line corresponding to the display plane is set at the center of the display area in FIG. 9, the location of the reference line can be changed.

Referring back to FIG. 4, the controller 180 can determine a location of a stereoscopic object having depth information from among the objects included in the contents on the screen such that the depth information of the stereoscopic object is reflected in the location thereof in step S103, as shown in FIG. 9.

On the contrary, the controller 180 can set the depth of a 2D object having no depth information to a default value and arrange the 2D object on the basis of the default value. For example, the controller 180 can set the depth of a 2D object having no depth information to 'depth 0' corresponding to the display plane and locate the 2D object at a position corresponding to 'depth 0' on the screen.

FIG. 10 illustrates an exemplary image displayed in the first mode when an object selected to generate the contents is a 2D object.

Referring to FIG. 10(a), the controller 180 arranges 2D objects OB21, OB22 and OB23 used to generate contents on the screen in response to a user input.

Upon entering the first mode, the controller 180 arranges the 2D objects OB21, OB22 and OB23 in a virtual stereoscopic space, as shown in FIG. 10(b). That is, the controller 180 sets depths of the 2D objects OB21, OB22 and OB23 to 'depth 0' and displays the 2D objects OB21, OB22 and OB23 at positions corresponding to 'depth 0'.

Referring back to FIG. 4, the controller 180 can move each object in the first mode in response to a user input. Further, the controller 180 changes depth information of each object based on the moved position as each object is moved (S104).

Upon movement of each object in response to the user input in step S104, the controller 180 can acquires motion information including a moving direction, moving distance and the like of each object and increase or decrease the depth of each object on the basis of the motion information.

For instance, the controller 180 can change depth information of an object such that the object is seen to be closer to the user as the object is moved to the bottom of the screen.

In addition, the controller 180 can change depth information of an object such that the object is seen to be distant from the user as the object is moved to the top of the screen.

When the reference line is set in the display area, the controller 180 can change depth information of an object such that the object is seen as if it is projected from the display plane or recessed from the display plane depending on the direction in which the object is moved on the basis of the reference line.

FIGS. 11 and 12 illustrate examples of changing depth information of an object in the virtual stereoscopic space.

Referring to FIG. 11, the controller 180 acquires motion information of a specific object OB22 as the object OB22 is moved to the bottom of the screen in response to a user input. The controller 180 changes depth information of the object OB22 such that stereoscopic vision that makes the object OB22 be seen to be closer to the user is obtained on the basis of the motion information.

Referring to FIG. 12, the controller 180 acquires motion information of the object OB22 as the object OB22 is moved to the top of the screen in response to a user input and changes the depth information of the object OB22 such that stereoscopic vision that makes the object OB22 be seen to be distant from the user is obtained on the basis of the motion information.

According to the first embodiment of the present invention, the controller 180 can automatically change a display size of each object on the basis of varied depth information of the object when the depth information is varied, as shown in FIGS. 11 and 12.

For example, the controller 180 can increase the display size of the object, as shown in FIG. 11, when the depth information of the object is changed such that the object is seen closer to the user.

Conversely, the controller 180 can increase the display size of the object, as shown in FIG. 12, when the depth information of the object is changed such that the object is seen distant from the user.

According to the first embodiment of the present invention, the controller 180 can change a location of an object in the contents, as shown in FIGS. 11 and 12, when the object is moved.

Referring to FIG. 11, the controller 180 can move the display position of the second object OB22 in the horizontal direction when the user moves the second object OB 22 in the horizontal direction as well as in the vertical direction. Specifically, when the second object OB22 is moved to the right on the screen as shown in FIG. 11, the controller 180 moves the location of the second object OB22 in the contents to the right.

Therefore, the user can freely change not only depth information of objects but also their locations in the virtual stereoscopic space.

Referring back to FIG. 4, the controller 180 can provide part of an image as a preview image such that the user can intuitively recognize a variation in the location of each object. That is, the controller 180 can display a preview image including objects arranged in the image on a predetermined portion of the screen.

Here, the preview image displayed in a preview area is a preview image of the contents, which is actually seen to the user when the objects currently arranged in the virtual stereoscopic space are generated as contents. The preview image can be displayed in the stereoscopic image display mode or in the 2D image display mode. When the preview image is displayed in the stereoscopic image display mode, the panel can be selectively activated such that stereoscopic vision is produced only for the preview area.

Figure 13:
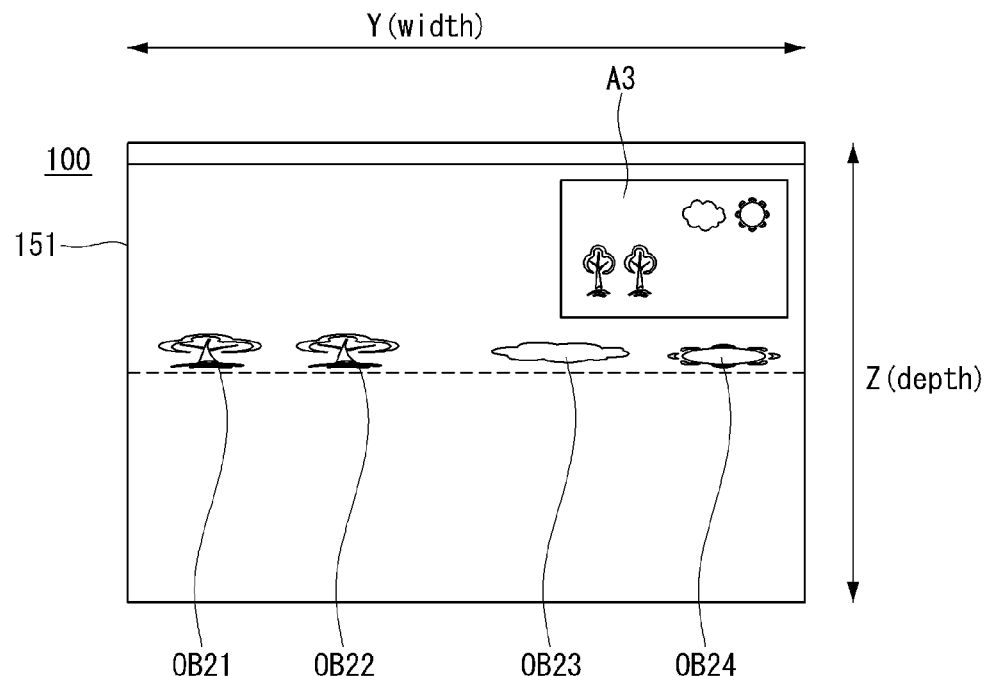
FIGS. 13 and 14 illustrate an example of displaying a preview image on part of a screen in the first mode in the electronic device 100 according to the first embodiment of the present invention.
Figure 14:
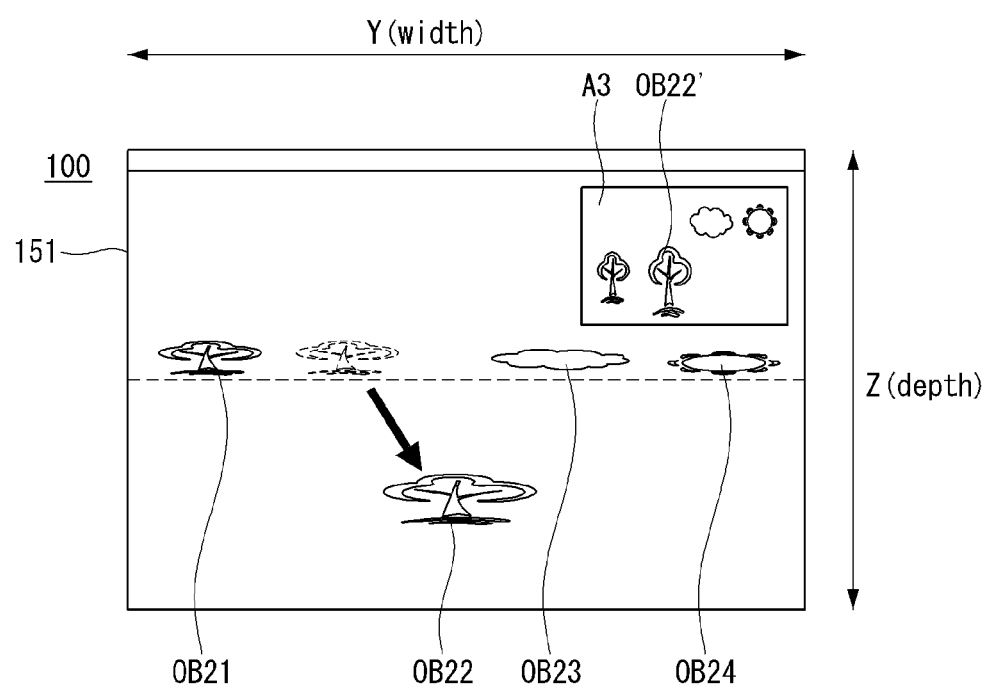

FIGS. 13 and 14 illustrate an example of displaying a preview image on a predetermined portion of the screen in the first mode.

Referring to FIG. 13, upon entering the first mode, the controller 180 arranges objects OB21 to OB24 in response to depth information thereof and moves the objects OB21 to OB24 to display the virtual stereoscopic space VS1 for varying the depth information of the objects OB21 to OB24 on the screen.

The controller 180 displays a preview image of contents including the objects OB21 to OB24 in a predetermined preview area A3 of the screen. The preview image displays the objects OB21 to OB24 currently arranged in the virtual stereoscopic space to the user.

Upon change of the locations and display sizes of the objects OB21 to OB24 in the virtual stereoscopic space VS1, the controller 180 displays the preview image in response to the changed locations and display sizes.

For example, when the display size of an object is changed since the object is moved, the controller 180 can vary the display size of the object in the preview image on the basis of the changed display size of the object. When the preview image is displayed in the stereoscopic image display mode, the controller 180 can control the object to be displayed in the preview image in response to the depth information of the object, which is changed as the object is moved.

Referring to FIG. 14, the controller 180 changes the depth information of the object OB22 to generate stereoscopic vision that makes the object OB22 be seen to be closer to the user as the object OB22 is moved down to the right on the screen. In addition, the controller 180 increases the display size of the object OB22 and moves the display position of the object OB22 to the right upon determination that the object OB22 becomes closer to the user.

The controller 180 controls display characteristics of the object OB22 displayed in the preview area A3 to be varied according to the changed display size and display position of the object OB22. That is, the controller 180 increases the display size of an object OB22' corresponding to the object OB22, displayed in the preview area A3, since the display size of the object OB22 displayed in the virtual stereoscopic space has been increased.

Further, the controller 180 moves the object OB22' displayed in the preview area A3 to the right since the object OB22 displayed in the virtual stereoscopic space has been moved to the right.

While the preview image is displayed in the 2D display mode in FIG. 14, the preview image can be displayed in the stereoscopic image display mode. When the preview image can be displayed in the stereoscopic image display mode, if the depth information of the object OB22 is changed as shown in FIG. 14, the controller 180 can display the object OB22' in the preview area A3 in response to the changed depth information.

Referring back to FIG. 4, when a second user input is applied in the first mode in which the objects are displayed in the virtual stereoscopic space on the basis of the depth information of the objects (S105), the controller 180 stores the display positions and depth information of the objects, set in the first mode, in the memory 160.

When the controller 180 enters the second mode for displaying a preview image of contents on the overall area of the screen, the controller 180 generates contents including the objects on the basis of the display positions and depth information of the objects, set in the first mode. Then, the controller 180 displays a preview image of the generated contents on the screen in the stereoscopic image display mode (S106).

In step S105, the second user input can be also generated through various methods.

The second unit input can be generated by a motion of the electronic device 100.

For example, the second user input can be generated as the electronic device 100 is rotated in a specific direction. Specifically, the controller 180 determines that the second user input is generated when sensing rotation of the electronic device 100 to a specific direction through the sensing unit 140.

Further, the second user input can be generated when the position of the electronic device 100 becomes a specific state such as a vertical state. To implement this, the controller 180 can sense tilting of the electronic device 100 through the sensing unit 140 and determine the position of the electronic device 100 on the basis of the sensed result.

The second user input can be generated by manipulation of a specific key button included in the user input unit 130.

Moreover, the second user input can be generated when a specific portion of the display area is touched.

In addition, the second user input can be generated by tapping a specific portion of the body of the electronic device 100. For example, the second user input can be generated by tapping the backside of the body of the electronic device 100.

Figure 15:
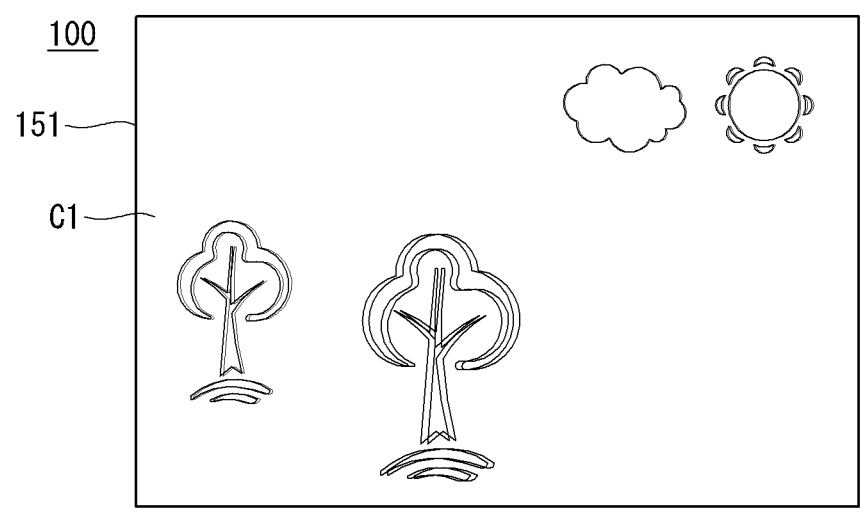
FIG. 15 illustrates an example of displaying a preview image of contents in a second mode in the electronic device 100 according to the first embodiment of the present invention.

FIG. 15 illustrates an example of displaying a preview image of contents in the second mode.

Referring to FIG. 15, when the controller 180 enters the second mode, the controller 180 generates contents C1 in response to the display positions and depth information of the objects OB21 to OB24, which are set in the first mode. That is, the controller 180 generates the contents C1 including the objects OB21 to OB24 on the basis of the display positions and depth information of the objects OB21 to OB24, which are set in the first mode. The controller 180 displays a preview image of the contents C1 in the overall area of the screen.

Referring back to FIG. 4, when the user checks the contents generated in the second mode and displayed on the screen and requests for storing the contents (S107), the controller 180 stores the contents displayed on the screen in the memory 160 (S108).

In the first embodiment of the invention, at least one object included in the contents is selected, and then the depth information, display positions, etc. of the objects are changed in the first mode. However, the present invention is not limited thereto.

According to the present invention, the controller 180 can select an object included in the contents in the first mode for displaying a virtual stereoscopic space. In this case, the controller 180 can add/delete an object selected by the user to/from the virtual stereoscopic space after entering the second mode so as to add/delete the object to/from the contents.

FIG. 16 illustrates an example of adding contents in the first mode.

Referring to FIG. 16(*a*), the controller 180 arranges objects in response to depth information thereof and displays the virtual stereoscopic space VS1 in which depth information of an object moved thereto is changed on the screen.

The controller 180 displays a list of objects that can be added to the contents in a first area S1 in response to a user input, as shown in FIG. 16(*b*). When an object OB25 is selected from the list and dragged to the virtual stereoscopic space VS1, the controller 180 arranges the object OB25 in the virtual stereoscopic space VS1, as shown in FIG. 16(*b*).

FIG. 16(*b*) illustrates a caser in which depth information of the object OB25 is set depending on a position to which the object OB25 is dragged. In other words, depth information corresponding to the position to which the object OB25 is dragged is initially set to the depth information of the object OB25. However, the present invention is not limited thereto.

According to the present invention, when the object OB25 is dragged to the virtual stereoscopic space VS1, the controller 180 may locate the object OB25 in response to depth information previously set to the object OB25 irrespective of the position to which the object OB25 is dragged. Otherwise, the controller 180 can initially set the depth of the object OB25 to a default value and locate the object OB25.

As described above, the first embodiment of the invention can allow the user to easily select objects included in contents that generate stereoscopic vision. Furthermore, the first embodiment of the invention can change depth information of an object only by moving the object in the virtual stereoscopic space. Moreover, the first embodiment of the invention can allow the user to intuitively recognize depth information of each object on the basis of relative positions of objects and distances between the reference line corresponding to the display plane and the objects, thereby enhancing user convenience.

In addition, it is possible to display a preview image on a predetermined portion of the screen such that the user can intuitively recognize a variation in the contents due to change of depth information and display sizes of objects so as to allow the user to edit the contents conveniently.

A method for generating contents in the electronic device 100 and an operation of the electronic device 100 to implement the method according to a second embodiment of the invention will now be described in detail with reference to the attached drawings.

Figure 17:
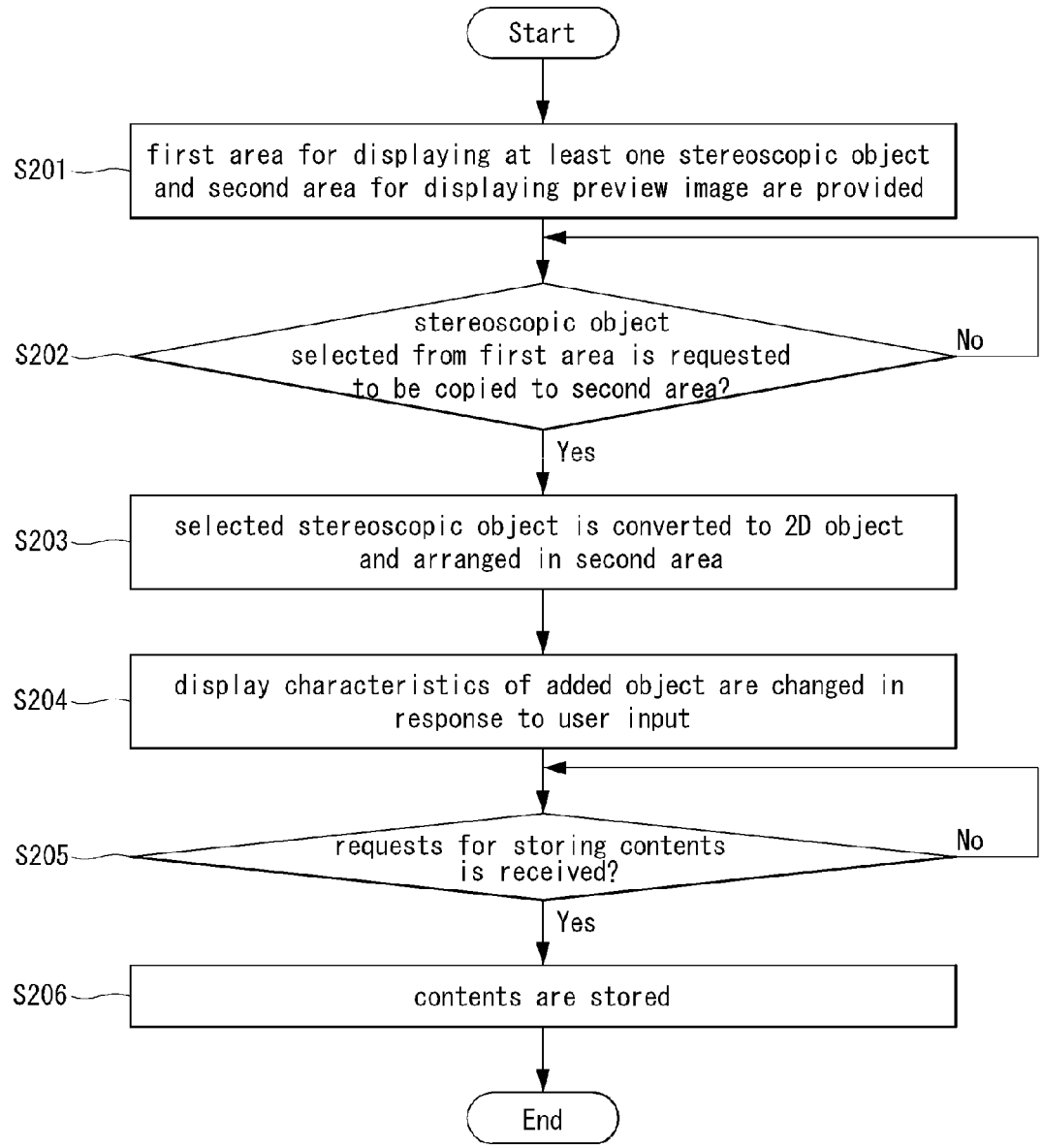
FIG. 17 is a flowchart illustrating a method for generating contents in electronic device 100 according to a second embodiment of the present invention.
Figure 18:
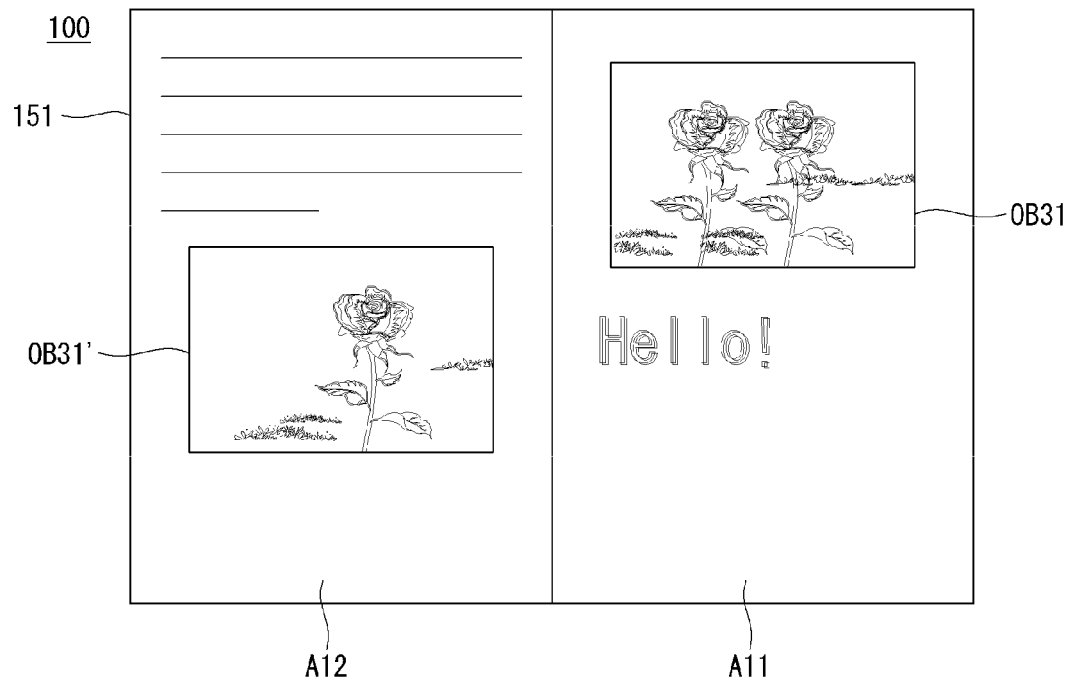
FIGS. 18 and 19 illustrate an example of arranging a 3D object, selected from a first region, on an application execution screen in the electronic device 100 according to the second embodiment of the present invention.
Figure 19:
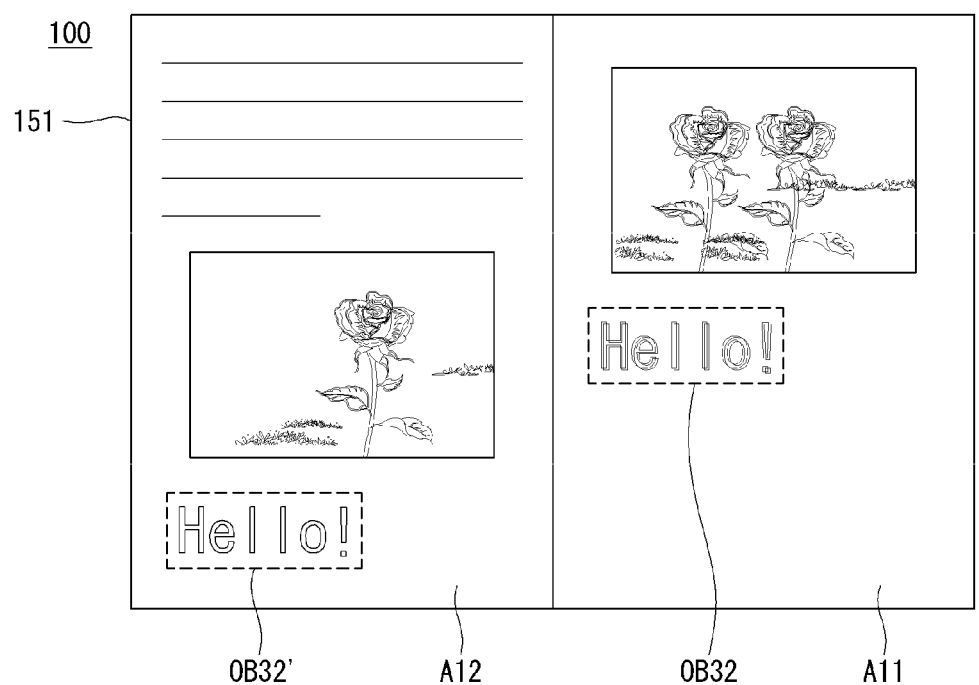

FIG. 17 is a flowchart illustrating the method for generating contents in the electronic device 100 according to the second embodiment of the invention and FIGS. 18 and 19 are diagrams for explaining the method for generating contents according to the second embodiment of the invention.

Referring to FIG. 17, the controller 180 provides a first area for displaying at least one stereoscopic object and a second area for displaying a preview image of contents to the display area in response to a user input (S201).

The first area can display at least one stereoscopic object in the stereoscopic display mode.

The second area is used to arrange the object displayed in the first area in advance and check the display size of the object. The second area displays a preview image of the contents, selected by the user.

In step S201, the preview image of the contents can be displayed as a 2D image in the second area. In this case, the controller 180 can display the preview image of the contents as the 2D image by selectively inactivating part of the panel included in the display unit 151 or setting depth information of the preview image displayed in the second area to 'depth 0' corresponding to the display plane such that the second area operates in the 2D image display mode.

Referring back to FIG. 17, upon reception of a user input to copy a stereoscopic object selected from the first area to the second area (S202), the controller 180 converts the selected stereoscopic object to a 2D object and displays the 2D object in the second area (S203). Specifically, the controller 180 changes depth information of the selected stereoscopic object to 'depth 0' corresponding to the display plane to convert the stereoscopic object to the 2D object and add the 2D object to the preview image displayed in the second area.

Here, the user input to copy the stereoscopic object displayed in the first area to the second area can be generated through various methods.

For example, the user input to copy the stereoscopic object selected from the first area to the second area can be generated when the stereoscopic object is dragged to the second area.

FIGS. 18 and 19 illustrate an example of arranging the stereoscopic object selected from the first area on an application execution screen.

Referring to FIG. 18, the controller 180 displays stereoscopic objects OB31 and OB32 in the first area A11 and displays a preview image of contents being edited by the user in the second area A12.

The controller 180 can display the stereoscopic objects OB31 and OB32 in the first area A11 through a method of displaying contents including stereoscopic objects in the first area A11 or displaying a list of previously stored stereoscopic objects in the first area.

The controller 180 copies the first stereoscopic object OB31 corresponding to a stereoscopic image displayed in the first area A11, converts the stereoscopic image OB31 to a 2D image OB31' as shown in FIG. 18 upon reception of a user input to copy the stereoscopic object OB31 to the second area S12, and adds the 2D image OB31' to the contents displayed in the second area A12.

Referring to FIG. 19, the controller 180 copies the second stereoscopic object OB32 corresponding to a stereoscopic text from among the stereoscopic objects OB31 and OB32 displayed in the first area A11, converts the stereoscopic test OB32 to a 2D text OB32' in response to a user input to copy the stereoscopic object OB32 to the second area A12, and arranges the 2D text OB32' in the second area A12.

Referring back to FIG. 17, upon copy of an object from the first area to the second area, the controller 180 can change display characteristics of the object newly added to the second area in response to a user input with respect to the object (S204). Here, the display characteristics of the object may include the display position, display size, etc. of the object.

When the display size of the object newly added to the second area is changed, depth information corresponding to the object may be automatically changed on the basis of the changed display size. For example, if the user increases the display size of the object newly added to the second area, the controller 180 can change the depth information of the object such that the object is moved toward the user and displayed.

Referring back to FIG. 17, when the user requests the contents displayed in the second area, which includes the stereoscopic object selected from the first area and added thereto, to be stored (S205), the controller 180 stores the contents in the memory 160 (S206).

In step S206, the controller 180 stores the original contents instead of the preview image displayed as the 2D image in the second area in the memory 160. Accordingly, the objects copied from the first area to the second area can be included in the contents and stored as stereoscopic objects When the display characteristics and depth information of the copied objects are changed while being displayed in the second area as a preview image, the objects can be included in the contents with the changed display characteristics and depth information.

In the case of copy and paste of a stereoscopic object that generates stereoscopic vision, the user usually has a difficult in recognizing how the stereoscopic object is displayed on the display plane due to stereoscopic effect thereof. That is, the user cannot easily recognize the display size and position of the stereoscopic object.

Therefore, the second embodiment of the invention converts a stereoscopic object to be added to contents to a 2D object and arranges the 2D object in a preview image of the contents, as described above, such that the user can check the stereoscopic object and intuitively recognize how the stereoscopic object is actually displayed on the display plane.

The above-described contents generation method of the electronic device may be written as computer programs and may be implemented in digital microprocessors that execute the programs using a computer readable recording medium. The contents generation method of the electronic device may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, and optical data storage devices. The computer readable recording medium may also be distributed over network coupled computer systems so that the computer readable code is stored and executed in a distribution fashion.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art.

What is claimed is:

1. An electronic device comprising:
a display module including a panel for generating stereoscopic vision; and
a controller configured to:
cause the display module to display a plurality of objects in a first area of the display module;
receive a first drag input to move at least one object of the plurality of objects from the first area to a second area of the display module;
cause the display module to display the moved at least one object in the second area;
receive a user input to enter a first mode for editing a 3D content in a virtual stereoscopic space comprising the moved at least one object, wherein the 3D content is a front view of the virtual stereoscopic space visualized in a front direction;

cause the display module to display a top view of the virtual stereoscopic space visualized in a top direction, wherein the top view comprises the moved at least one object visualized in the top direction, wherein the moved at least one object is disposed in the top view based on depth information of the moved at least one object, wherein a side of the top view represents a plurality of increasing depth levels;

cause the display module to display a reference line in the top view, wherein the reference line is a line connecting points of predetermined reference depth;

cause the display module to display a preview image of the front view on a predetermined area of the top view in the first mode;

receive a second drag input to move a first object of the moved at least one object from a first position to a second position in the top view;

change depth information for displaying the first object in the 3D content according to the depth level that is associated with the second position of the first object within the top view; and cause the display module to change the preview image according to the changed depth information.

2. The electronic device of claim 1, wherein the controller is further configured to enter a second mode for displaying the 3D content including the moved at least one object on the basis of the depth information of the moved at least one object.

3. The electronic device of claim 2, further comprising a sensing unit configured to sense a motion of the electronic device, and wherein the controller is further configured to control conversion between the first mode and the second mode on the basis of the motion of the electronic device.

4. The electronic device of claim 1, wherein when the depth information is changed in the first mode, the controller changes a display size of the first object on the basis of the changed depth information.

5. The electronic device of claim 1, further comprising a user input unit configured to receive a user input, wherein the controller is further configured to add an object to the 3D content or delete an object included in the 3D content in response to the user input received in the first mode.

6. The electronic device of claim 5, wherein when a stereoscopic object is added into the 3D content in the first mode, the controller is further configured to display the stereoscopic object at a position determined in response to depth information of the stereoscopic object.

7. The electronic device of claim 5, wherein when a 2D object is added into the 3D content in the first mode, the controller is further configured to display the 2D object at a position determined according to predetermined depth information.

8. The electronic device of claim 1, wherein the controller determines a distance between the displayed location of the first object and the reference line in response to the depth information.

9. The electronic device of claim 1, wherein when the first object is moved in response to a user input received in the first mode, the controller is further configured to change a display characteristic of the first object according to movement of the first object, and to display the preview image of the 3D content to reflect the changed display characteristic of the first object.

10. The electronic device of claim 1, wherein the controller is further configured to:

cause the display module to display the plurality of objects in the virtual stereoscopic space that is included within a first region of the display module;

cause the display module to change the displayed location of the first object within the first region of the display module in response to the input; and cause the display module to display a second plurality of objects as stereoscopic images in the stereoscopic space that is included within a second region of the display module simultaneously with the displaying of the plurality of objects in the virtual stereoscopic space, wherein each object of the plurality of objects in the virtual stereoscopic space corresponds to an object of the second plurality of objects, and wherein changes in the displayed location and depth level of the first object within the first region corresponds to changes in displayed location and depth level of a corresponding first object, of the second plurality of objects, in the stereoscopic space within the second region.

* * * * *